US010503646B2

(12) United States Patent
Mola

(10) Patent No.: US 10,503,646 B2
(45) Date of Patent: Dec. 10, 2019

(54) DECOUPLING TRACE DATA STREAMS USING CACHE COHERENCE PROTOCOL DATA

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 15/872,453

(22) Filed: Jan. 16, 2018

(65) Prior Publication Data

US 2019/0220403 A1   Jul. 18, 2019

(51) Int. Cl.
*G06F 12/084* (2016.01)
*G06F 11/36* (2006.01)

(52) U.S. Cl.
CPC .......... *G06F 12/084* (2013.01); *G06F 11/362* (2013.01); *G06F 11/3636* (2013.01); *G06F 2212/656* (2013.01)

(58) Field of Classification Search
CPC ............. G06F 11/3636; G06F 11/3664; G06F 12/084; G06F 2212/283; G06F 11/00; G06F 11/3466; G06F 11/3476; G06F 11/36; G06F 11/3624; G06F 12/0815; G06F 2009/45591; G06F 2201/885; G06F 11/362; G06F 2212/656
See application file for complete search history.

(56) References Cited

U.S. PATENT DOCUMENTS

| | | | |
|---|---|---|---|
| 4,598,364 A | 7/1986 | Gum et al. |
| 5,381,533 A | 1/1995 | Peleg et al. |
| 5,905,855 A | 5/1999 | Klaiber et al. |
| 5,944,841 A | 8/1999 | Christie |
| 6,009,270 A | 12/1999 | Mann |

(Continued)

OTHER PUBLICATIONS

Narayanasamy, et al., "BugNet: Continuously Recording Program Execution for Deterministic Replay Debugging", In Proceedings of the 32nd Annual International Symposium on Computer Architecture, Jun. 4, 2005, 12 Pages. (Year: 2005).*

(Continued)

*Primary Examiner* — Zhuo H Li
(74) *Attorney, Agent, or Firm* — Workman Nydegger

(57) ABSTRACT

Decoupling trace data streams using cache coherence protocol (CCP) data. One or more trace data streams include cache activity trace data and CCP trace data relating to executing a plurality of threads. The cache activity trace data includes inter-thread data dependencies comprising dependent cache activity trace entries, which each record a corresponding memory access by a corresponding thread in reliance on traced CCP dependence between threads. The inter-thread data dependencies are removed to create independent cache activity trace data for each of the plurality of threads that enables each thread to be replayed independently. The removal includes, for each dependent cache activity trace entry (i) identifying a corresponding value of the corresponding memory access by the corresponding thread based on the traced CCP dependence between threads, and (ii) recording the corresponding value of the corresponding memory access on behalf of the corresponding thread.

20 Claims, 13 Drawing Sheets

(56) References Cited

U.S. PATENT DOCUMENTS

| | | |
|---|---|---|
| 6,094,729 A | 7/2000 | Mann |
| 6,101,524 A | 8/2000 | Choi et al. |
| 6,167,536 A | 12/2000 | Mann |
| 6,351,844 B1 | 2/2002 | Bala |
| 6,634,011 B1 | 10/2003 | Peltier et al. |
| 6,728,949 B1 | 4/2004 | Bryant et al. |
| 6,854,108 B1 | 2/2005 | Choi |
| 7,055,070 B1 | 5/2006 | Uhler et al. |
| 7,089,400 B1 | 8/2006 | Pickett et al. |
| 7,178,133 B1 | 2/2007 | Thekkath |
| 7,181,728 B1 | 2/2007 | Thekkath |
| 7,448,025 B2 | 11/2008 | Kalafatis et al. |
| 7,620,938 B2 | 11/2009 | Edwards et al. |
| 7,676,632 B2 | 3/2010 | Miller |
| 7,877,630 B1 | 1/2011 | Favor et al. |
| 7,958,497 B1 | 6/2011 | Lindo et al. |
| 8,010,337 B2 | 8/2011 | Narayanan et al. |
| 8,423,965 B2 | 4/2013 | Goel et al. |
| 8,468,501 B2 | 6/2013 | Subhraveti |
| 8,484,516 B2 | 7/2013 | Giannini et al. |
| 8,499,200 B2 | 7/2013 | Cathro |
| 8,612,650 B1 | 12/2013 | Carrie et al. |
| 8,719,796 B2 | 5/2014 | Rosu et al. |
| 9,015,441 B2 | 4/2015 | Worthington et al. |
| 9,058,415 B1 | 6/2015 | Serebrin et al. |
| 9,268,666 B2 | 2/2016 | Law et al. |
| 9,300,320 B2 | 3/2016 | Ansari et al. |
| 9,361,228 B2 | 6/2016 | Turner et al. |
| 9,535,815 B2 | 1/2017 | Smith et al. |
| 9,569,338 B1 | 2/2017 | Bradbury et al. |
| 9,767,237 B2 | 9/2017 | Suresh et al. |
| 10,031,833 B2 | 7/2018 | Mola |
| 10,031,834 B2 | 7/2018 | Mola |
| 10,042,737 B2* | 8/2018 | Mola .................. G06F 11/3636 |
| 2002/0124237 A1 | 9/2002 | Sprunt et al. |
| 2002/0144101 A1 | 10/2002 | Wang et al. |
| 2003/0079205 A1 | 4/2003 | Miyao et al. |
| 2003/0126508 A1 | 7/2003 | Litt |
| 2004/0117690 A1 | 6/2004 | Andersson |
| 2005/0155019 A1 | 7/2005 | Levine et al. |
| 2005/0223364 A1 | 10/2005 | Peri et al. |
| 2006/0112310 A1 | 5/2006 | Mchale et al. |
| 2006/0230390 A1 | 10/2006 | Alexander et al. |
| 2007/0106827 A1 | 5/2007 | Boatright et al. |
| 2007/0130237 A1 | 6/2007 | Altman et al. |
| 2007/0150881 A1 | 6/2007 | Khawand et al. |
| 2007/0214342 A1 | 9/2007 | Newburn et al. |
| 2007/0220361 A1 | 9/2007 | Barnum et al. |
| 2008/0065810 A1 | 3/2008 | Spanel et al. |
| 2008/0091867 A1 | 4/2008 | Plondke et al. |
| 2008/0114964 A1 | 5/2008 | Davis et al. |
| 2008/0115113 A1 | 5/2008 | Codrescu et al. |
| 2008/0215920 A1 | 9/2008 | Mayer et al. |
| 2008/0250207 A1 | 10/2008 | Davis et al. |
| 2008/0256396 A1 | 10/2008 | Giannini et al. |
| 2008/0288826 A1 | 11/2008 | Nemoto |
| 2008/0313637 A1* | 12/2008 | Youn .................. G06F 9/5027 718/102 |
| 2009/0037886 A1 | 2/2009 | Mccoy et al. |
| 2009/0144742 A1 | 6/2009 | Subhraveti et al. |
| 2010/0205484 A1 | 8/2010 | Dragicevic et al. |
| 2010/0250856 A1 | 9/2010 | Owen et al. |
| 2010/0251031 A1 | 9/2010 | Nieh et al. |
| 2010/0268995 A1 | 10/2010 | Goodman et al. |
| 2011/0271070 A1 | 11/2011 | Worthington et al. |
| 2011/0276761 A1 | 11/2011 | Saha et al. |
| 2011/0288847 A1 | 11/2011 | Narayanan et al. |
| 2012/0095728 A1 | 4/2012 | Ubukata |
| 2013/0036403 A1 | 2/2013 | Geist |
| 2013/0086567 A1 | 4/2013 | Inoue et al. |
| 2013/0097607 A1* | 4/2013 | Lewis .................. G06F 9/4843 718/102 |
| 2014/0059523 A1 | 2/2014 | Frazier et al. |
| 2014/0281710 A1 | 9/2014 | Cain et al. |
| 2014/0372987 A1 | 12/2014 | Strong et al. |
| 2015/0089155 A1 | 3/2015 | Busaba et al. |
| 2015/0089301 A1 | 3/2015 | Laurenti |
| 2015/0269074 A1* | 9/2015 | Shah .................. G06F 12/084 711/130 |
| 2015/0355996 A1 | 12/2015 | Smith et al. |
| 2015/0378870 A1 | 12/2015 | Marron et al. |
| 2016/0292061 A1 | 10/2016 | Marron et al. |
| 2017/0052876 A1 | 2/2017 | Svensson et al. |
| 2017/0140082 A1 | 5/2017 | Suresh et al. |
| 2017/0161173 A1 | 6/2017 | Bradbury et al. |
| 2018/0060214 A1 | 3/2018 | Mola |
| 2018/0060215 A1 | 3/2018 | Mola |
| 2018/0314623 A1 | 11/2018 | Mola |
| 2019/0087305 A1* | 3/2019 | Mola .................. G06F 11/364 |

OTHER PUBLICATIONS

"International Search Report and Written Opinion Issued in PCT Application No. PCT/US2019/012801", dated Apr. 1, 2019, 12 Pages.

Narayanasamy, et al., "Recording Shared Memory Dependencies Using Strata", In Proceeding of the 12th International Conference on Architectural Support for Programming Languages and Operating Systems, Oct. 21, 2006, pp. 229-240.

"7 Recording Inferior's Execution and Replaying It", Retrieved From: https://web.archive.org/web/20161009233228/https://sourceware.org/gdb/onlinedocs/gdb/Process-Record-and-Replay.html, Retrieved on: May 27, 2016, 6 Pages.

"Non-final Office Action Issued in U.S. Appl. No. 15/349,555", dated Oct. 6, 2017, 22 Pages.

"Elm's Time Traveling Debugger", Retrieved From: https://web.archive.org/web/20160522023348/http://debug.elm-lang.org/, Retrieved on: May 22, 2016, 4 Pages.

"IntelliTrace", Retrieved From: https://web.archive.org/web/20160521122918/https://msdn.microsoft.com/en-us/library/dd264915.aspx, Retrieved Date: May 21, 2016, 5 Pages.

"rr: Lightweight Recording & Deterministic Debugging", Retrieved From: https://web.archive.org/web/20160521063109/https://rr-project.org/, Retrieved on: May 21, 2016, 4 Pages.

"Non-Final Office Action Issued in U.S. Appl. No. 15/252,998", dated Sep. 20, 2017, 15 Pages.

"Non-final Office Action Issued in U.S. Appl. No. 15/253,027", dated Oct. 10, 2017, 25 Pages.

"Notice of Allowance Issued in U.S. Appl. No. 15/253,027", dated Mar. 21, 2018, 13 Pages.

"Notice of Allowance Issued in U.S. Appl. No. 15/349,555", dated Mar. 29, 2018, 21 Pages.

Barr, et al., "TARDIS: Affordable Time-Travel Debugging in Managed Runtimes", In Proceedings of the International Conference on Object Oriented Programming Systems Languages & Applications, Oct. 20, 2014, 16 Pages.

Bhansali, et al., "Framework for Instruction-level Tracing and Analysis of Program Executions", In Proceedings of the 2nd International Conference on Virtual Execution Environments, Jun. 14, 2006, pp. 154-163.

Brady, Fiorenza, "Cambridge University Study States Software Bugs Cost Economy $312 Billion Per Year", Retrieved From: http://www.prweb.com/releases/2013/1/prweb10298185.htm, Jan. 8, 2013, 4 Pages.

Charles, "Arun Kishan: Inside Windows 7—Farewell to the Windows Kernel Dispatcher Lock", Retrieved From: https://channel9.msdn.com/shows/Going+Deep/Arun-Kishan-Farewell-to-the-Windows-kernel-Dispatcher-Lock/, Aug. 6, 2009, 9 Pages.

Dimitrov, et al., "Time-Ordered Event Traces: A New Debugging Primitive for Concurrency Bugs", In Proceedings of IEEE International Parallel & Distributed Processing Symposium (IPDPS), May 16, 2011, pp. 311-321.

Guo, et al., "R2: An Application-Level Kernel for Record and Replay", In Proceedings of the 8th USENIX Symposium on Operating Systems Design and Implementation, Dec. 8, 2008, pp. 193-208.

(56) References Cited

OTHER PUBLICATIONS

Hower, et al., "Two Hardware-Based Approaches For Deterministic Multiprocessor Replay", Published in Communications of the ACM, vol. 52, Isssue 6, Jun. 1, 2009, pp. 93-100.

Jiang, et al., "CARE: Cache Guided Deterministic Replay for Concurrent Java Programs", In Proceedings of the 36th International Conference on Software Engineering, May 31, 2014, 11 Pages.

King, et al., "Debugging Operating Systems With Time-Traveling Virtual Machines", In Proceedings of Annual USENIX Technical Conference, Apr. 10, 2005, pp. 1-15.

Kleen, Andi, "Adding Processor Trace Support to Linux", Retrieved From: https://lwn.net/Articles/648154/, Jul. 1, 2015, 7 Pages.

Lai, et al., "A Versatile Data Cache for Trace Buffer Support", In Journal of IEEE Transactions on Circuits and Systems, vol. 61, Issue 11, Nov. 2014, pp. 3145-3154.

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

Liang, et al., "Improved Procedure Placement for Set Associative Caches", In Proceedings of the International Conference on Compilers, Architectures and Synthesis for Embedded Systems, Oct. 24, 2010, pp. 147-156.

Liang, et al., "Instruction Cache Locking Using Temporal Reuse Profile", In Proceedings of the 47th Design Automation Conference, Jun. 13, 2010, pp. 344-349.

Mercer, et al., "Model Checking Machine Code with the GNU Debugger", In Proceedings of the 12th International Conference on Model Checking Software, Aug. 22, 2005, 15 Pages.

Xu, et al., "ReTrace: Collecting Execution Trace with Virtual Machine Deterministic Replay", In Proceedings of the Third Annual Workshop on Modeling, Benchmarking and Simulation, Jan. 1, 2007, 8 Pages.

Narayanasamy, et al., "BugNet: Continuously Recording Program Execution for Deterministic Replay Debugging", In Proceedings of the 32nd Annual International Symposium on Computer Architecture, Jun. 4, 2005, 12 Pages.

"International Search Report and Written Opinion Issued in PCT Application No. PCT/US2017/048094", dated Nov. 10, 2017, 12 Pages.

"International Search Report and Written Opinion Issued in PCT Application No. PCT/US2017/060075", dated Feb. 28, 2018, 11 Pages.

Rivers, et al., "Utilizing Reuse Information in Data Cache Management", In Proceedings of the 12th International Conference on Supercomputing, Jul. 13, 1998, pp. 449-456.

Sahuquillo, et al., "The Filter Cache: A Run-Time Cache Management Approach", In Proceedings of 25th EUROMICRO Conference, Sep. 8, 1999, 8 Pages.

Shaaban, et al., "Improving Trace Cache Hit Rates Using the Sliding Window Fill Mechanism and Fill Select Table", In Proceedings of the Workshop on Memory System Performance, Jun. 8, 2004, pp. 36-41.

Sharma, Suchakrapani Datt., "Hardware Tracing with Intel Processor Trace", Retrieved From: http://hsdm.dorsal.polymtl.ca/system/files/10Dec2015_0.pdf, Dec. 10, 2015, 30 Pages.

Tchagou, et al., "Reducing Trace Size in Multimedia Applications Endurance Tests", In Proceedings of Design, Automation & Test in Europe Conference & Exhibition (DATE), Mar. 9, 2015, 2 Pages.

Uzelac, et al., "Hardware-Based Load Value Trace Filtering for On-the-Fly Debugging", In Proceedings of ACM Transactions on Embedded Computing Systems, vol. 12, Issue 2, Article 97, May 2013, 18 pages.

* cited by examiner

| ID | @1 P0 | @1 P1 | @1 P2 | @1 P3 | @2 P0 | @2 P1 | @2 P2 | @2 P3 | @3 P0 | @3 P1 | @3 P2 | @3 P3 | CCP Trace | Cache Activity Trace |
|---|---|---|---|---|---|---|---|---|---|---|---|---|---|---|
| 1 | R | | | | | | | | | | | | | P0: Read <Data A> |
| 2 | | | | | R | | | | | | | | | |
| 3 | | | | | | | | R | | | | | | P0: Read <Data B> |
| 4 | | | | R | | | | | | | | | | |
| 5 | | R | | | | | | | | | | | @1: P0 | P1: Read |
| 6 | | | | | W | | | | | | | | @2: P0(2) | P0: Write [Data C] |
| 7 | | | | R | | | | | | | | | | |
| 8 | | | | | | R | | | | | | | | |
| 9 | | | | | | | | | | | R | | @2: P0 | P2: Read <Data D> |
| 10 | W | | | | | | | | | | | | | P1: Read |
| 11 | | | | R | | | | | | | | | @1: P0(3) | P0: Write [Data E] |
| 12 | | | | | | | | | | R | | | @3: P2 | P1: Read |
| 13 | | | | | | | W | | | | | | @2: P0(2) | P2: Write [Data F] |
| 14 | | R | | | | | | | | | | | @1: P0 | P1: Read |
| 15 | | | | | | R | | | | | | | @2: P2 | P1: Read |
| 16 | | | R | | | | | | | | | | @1: P0 | P2: Read |
| 17 | | | R | | | | | | | | | | @1: P0 | P2: Read |
| 18 | | | | | | | | | | W | | | @3: P1(3) | P1: Write [Data G] |
| 19 | W | | | | | | | | | | | | @1: P0(3) | P0: Write [Data H] |
| 20 | | | | | | | | | R | | | | @3: P1 | P0: Read |

| ID | Log: P0 |
|---|---|
| 1 | Read <Data A> |
| 3 | Write <Data B> |
| 20 | Read <Data G> * |

1001

| ID | Log: P1 |
|---|---|
| 5 | Read |
| 9 | Read <Data C> * |
| 12 | Read <Data D> * |
| 14 | Read |
| 15 | Read <Data F> * |

1002

| ID | Log: P2 |
|---|---|
| 8 | Read <Data D> |
| 13 | Write |
| 16 | Read |
| 17 | Read |

DECOUPLING TRACE DATA STREAMS USING CACHE COHERENCE PROTOCOL DATA

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, a bit-accurate trace of execution of a program (e.g., executable entities such as threads) is recorded/traced by a trace application into one or more trace files. These bit-accurate traces can then be used to replay execution of the program later, for both forward and backward analysis. For example, "time travel" debuggers can enable a developer to set forward breakpoints/watchpoints (like conventional debuggers) as well as reverse breakpoints/watchpoints.

Some "time travel" debugging tools reduce the overhead of recording a trace (e.g., processor and memory overheads, and outputted trace file size) by utilizing a processor's shared cache, along with its cache coherence protocol (CCP), in order to determine what data should be logged to a trace file. Doing so can reduce trace file size by several orders of magnitude when compared to prior approaches, thereby significantly reducing the overhead of trace recording.

BRIEF SUMMARY

Embodiments herein enhance replay performance of traces recorded by utilizing a processor's cache coherence protocol (CCP) to decouple trace data dependencies within CCP-based traces, such that these traces can be replayed in a thread-independent manner. In particular, when a trace is recorded using a CCP, values read by one thread may actually have been logged in connection with another thread, or may be otherwise available based on execution of that other thread. For example, a trace recorder may log a particular value stored at a particular memory location in connection with a first thread that initially read that value from the particular memory location. Alternatively, the trace recorder may choose refrain from logging that value if it was written to the particular memory location by the first thread—since it can be obtained through replay of the first thread. When a second thread reads that same value from the particular memory location via a shared cache, a logger might use CCP data to choose to refrain from re-logging that value in connection with the second thread. Thus, the second thread becomes dependent on the first thread during trace replay.

While recording traces in this way can significantly increase record performance and reduce trace file size, it limits the ability of a debugger to parallelize replay of the traced program during consumption of the trace file(s), which can significantly degrade replay performance for multi-threaded applications. As such, embodiments employ techniques to process these CCP-based traces after they have been recorded to eliminate these inter-thread dependencies. This includes identifying the dependencies, determining any appropriate values, and recording new trace data streams, and/or augmenting existing trace data stream(s), so that they can be replayed in a thread-independent manner.

Embodiments include methods, systems, and computer program products that decouple trace data streams using CCP data. These embodiments include identifying, within a trace of a prior execution of an application, one or more trace data streams that log execution of a plurality of threads during the prior execution of the application. The one or more trace data streams include cache activity trace data and CCP trace data. The cache activity trace data includes one or more inter-thread data dependencies comprising one or more dependent cache activity trace entries, which each record a corresponding memory access by a corresponding thread in reliance on traced CCP dependence between threads. The one or more inter-thread data dependencies are removed to create independent cache activity trace data for each of the plurality of threads that enables each thread to be replayed independently. The removal includes, for each dependent cache activity trace entry (i) identifying a corresponding value of the corresponding memory access by the corresponding thread based on the traced CCP dependence between threads, and (ii) recording the corresponding value of the corresponding memory access on behalf of the corresponding thread.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF SUMMARY OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates an example of a CCP-based log, in which the CCP only permits logging one of the readers and a total count of readers;

FIG. 10 illustrates example decoupled trace data streams corresponding to the CCP-based log of FIG. 7;

DETAILED DESCRIPTION

Embodiments herein enhance replay performance of traces recorded by utilizing a processor's cache coherence protocol (CCP) to decouple trace data dependencies within CCP-based traces, such that these traces can be replayed in a thread-independent manner. In particular, when a trace is recorded using a CCP, values read by one thread may actually have been logged in connection with another thread, or may be otherwise available based on execution of that other thread. For example, a trace recorder may log a particular value stored at a particular memory location in connection with a first thread that initially read that value from the particular memory location. Alternatively, the trace recorder may choose refrain from logging that value if it was written to the particular memory location by the first thread—since it can be obtained through replay of the first thread. When a second thread reads that same value from the particular memory location via a shared cache, a logger might use CCP data to choose to refrain from re-logging that value in connection with the second thread. Thus, the second thread becomes dependent on the first thread during trace replay.

While recording traces in this way can significantly increase record performance and reduce trace file size, it limits the ability of a debugger to parallelize replay of the traced program during consumption of the trace file(s), which can significantly degrade replay performance for multi-threaded applications. As such, embodiments employ techniques to process these CCP-based traces after they have been recorded to eliminate these inter-thread dependencies. This includes identifying the dependencies, determining any appropriate values, and recording new trace data streams, and/or augmenting existing trace data stream(s), so that they can be replayed in a thread-independent manner.

Figure 1:
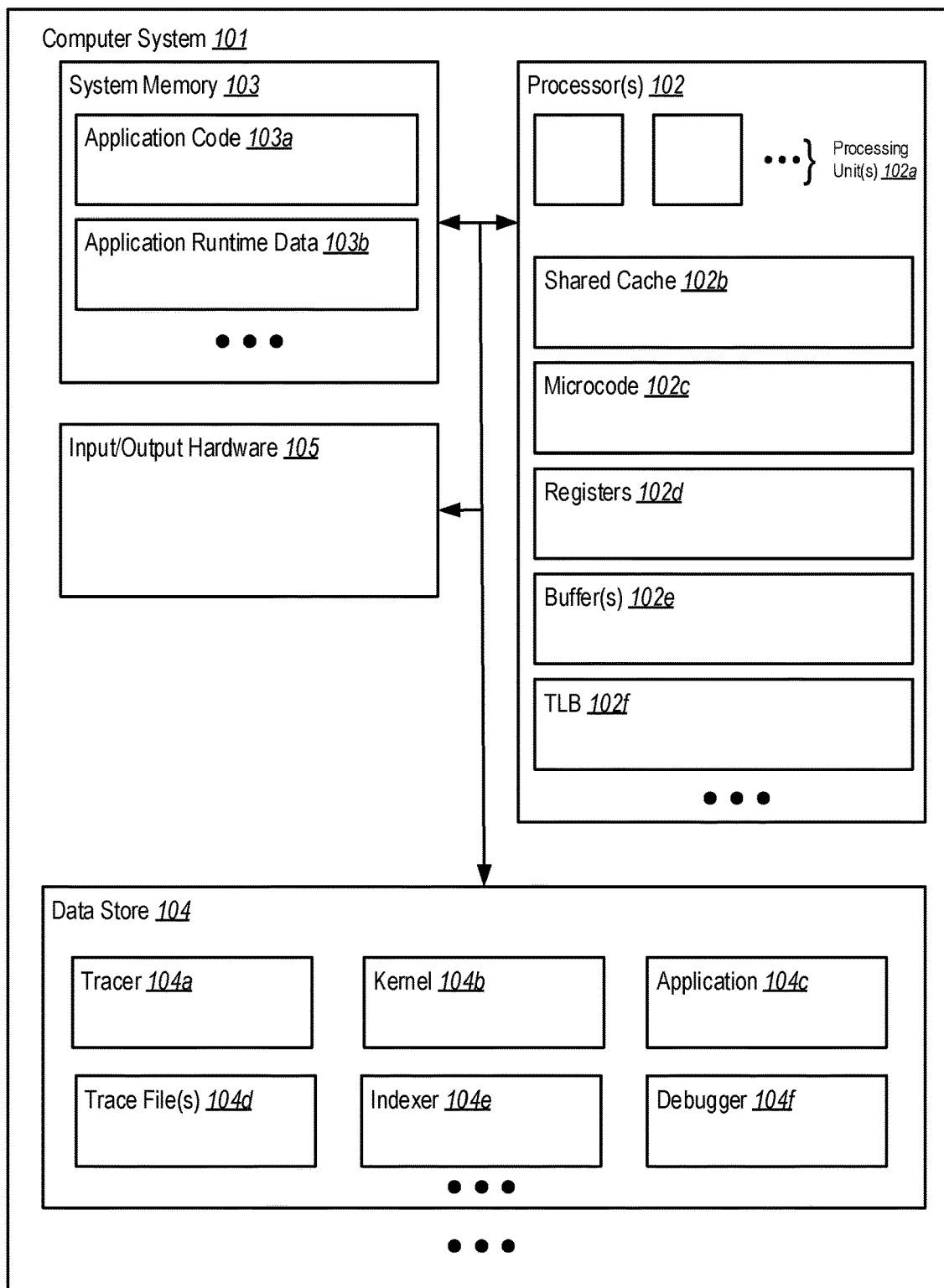
FIG. 1 illustrates an example computing environment that facilitates recording and replay of "bit-accurate" traces of code execution via shared caches using cache coherence protocol (CCP) data.

In order to facilitate an understanding of the foregoing, FIG. 1 illustrates an example computing environment 100 that facilitates recording and replay of "bit-accurate" traces of code execution via shared caches using CCP data. As depicted, embodiments may comprise or utilize a special-purpose or general-purpose computer system 101 that includes computer hardware, such as, for example, one or more processors 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the data store 104 can store computer-executable instructions and/or data structures representing application programs such as, for example, a tracer 104a, an operating system kernel 104b, an application 104c (e.g., the application that is the subject of tracing by the tracer 104a), an indexer 104e, a debugger 104f, etc. When these programs are executing (e.g., using the processor(s) 102), the system memory 103 can store corresponding runtime data, such as runtime data structures, computer-executable instructions, etc. Thus, FIG. 1 illustrates the system memory 103 as including time application code 103a and application runtime data 103b (e.g., each corresponding with application 104c).

The tracer 104a is usable to record a bit-accurate trace of execution of an application, such as application 104c or kernel 104b, and to store trace data in trace file(s) 104d. In some embodiments, the tracer 104a is a standalone application, while in other embodiments the tracer 104a is integrated into another software component, such as the kernel 104b, a hypervisor, a cloud fabric, the debugger 104f, etc. While the trace file(s) 104d are depicted as being stored in the data store 104, the trace file(s) 104d may also be recorded exclusively or temporarily in the system memory 103, or at some other storage device. As alluded to above, the tracer 104a may store data in the trace file(s) 104d in a manner that reduces the overhead of executing the tracer 104a and/or that is focused on reducing or minimizing a size of the trace file(s) 104d.

The indexer 104e takes the trace file(s) 104d generated by the tracer 104a as input, and performs transformation(s) to the data in the trace file(s) 104d that improves performance of consumption of the trace file(s) 104d (or derivatives thereof) by the debugger 104f. While the indexer 104e could make a variety of changes to the trace file(s) 104d (e.g., adding key frames, adding memory snapshots, adding reverse-lookup data structures, etc.), the embodiments herein at least utilize a CCP of a processor used to execute the tracer 104a (e.g., processor(s) 102, though they could be different processors if the tracer 104a was executed at a different computer system) in order to decouple trace data dependencies within the trace file(s) 104d. These techniques are discussed hereinafter.

The debugger 104f is usable to consume the trace file(s) 104d, including any derivatives of the trace file(s) 104d that were generated by the indexer 104e (executing at this, or another, computer system), in order to assist a user in performing debugging actions on the trace file(s) 104d or derivatives thereof. For example, the debugger 104f could present one or more debugging interfaces (e.g., user interfaces and/or application programming interfaces), replay prior execution of one or more portions of the application 104c, set breakpoints/watchpoints including reverse breakpoints/watchpoints, enable queries/searches over the trace file(s) 104d, etc. In some embodiments, the tracer 104a and/or the indexer 104e are sub-components of the debugger 104f.

FIG. 1 includes a simplified representation of the internal hardware components of the processor 102. As illustrated, each processor 102 includes a plurality of processing units 102a. Each processing unit may be physical (i.e., a physical processor core) and/or logical (i.e., a logical core presented by a physical core that supports hyper-threading, in which more than one application threads executes at the physical core). Thus, for example, even though the processor 102 may in some embodiments include only a single physical processing unit (core), it could include two or more logical processing units 102a presented by that single physical processing unit.

Each processing unit 102a executes processor instructions that are defined by applications (e.g., tracer 104a, kernel 104b, application 104c, etc.), and which instructions are selected from among a predefined processor instruction set architecture (ISA). The particular ISA of each processor 102 varies based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally-visible (i.e., external to the processor) unit of code that is executable by a processor. Notably, different ISA's define different memory models that can enforce restrictions on how processor instructions can access memory. Some memory models are weakly ordered, providing flexibility in how processor instructions can access memory, including enabling the processor to re-order instructions (and memory accesses) during execution.

Each processing unit 102a obtains processor instructions from a shared processor cache 102b, and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of a backing store, such as the system memory 103 and/or another cache. For example, when executing the application code 103a, the shared cache 102b contains portions of the application runtime data 103b. If the processing unit(s) 102a require data not already stored in the shared cache 102b, then a "cache miss" occurs, and that data is fetched from the system memory 103 (potentially "evicting" some other data from the shared cache 102b).

Figure 2:
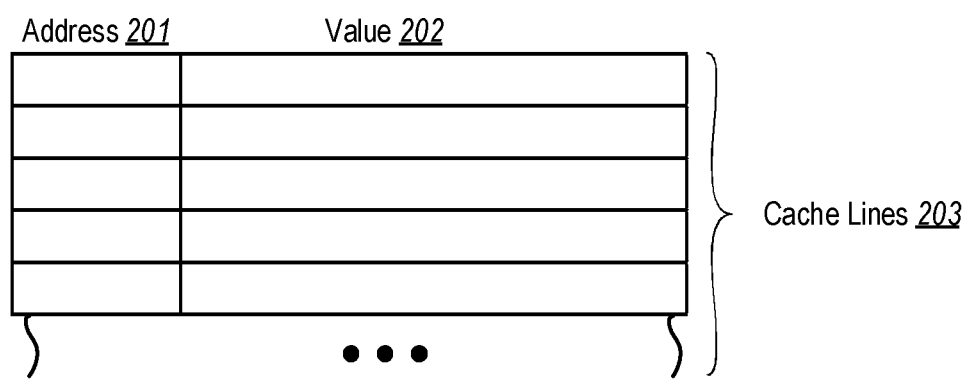
FIG. 2 illustrates an example of a shared cache.

Typically, a shared cache 102b comprises a plurality of "cache lines," each of which stores a corresponding portion of memory from the backing store. For example, FIG. 2 illustrates an example of at least a portion of a shared cache 200, which includes a plurality of cache lines 203, each of which includes an address portion 201 and a value portion 202. The address portion address portion 201 of each cache line 203 can store an address in the backing store (e.g., system memory 103) for which it the line corresponds, and the value portion 202 can initially store a value received from the backing store. The value portion 202 can be modified by the processing units 102a, and eventually be evicted back to the backing store. As indicated by the ellipses, a shared cache 200 can include a large number of cache lines. For example, a contemporary INTEL processor may contain a layer-1 cache comprising 512 cache lines or more. In this cache, each cache line is usable to store a 64 byte (512 bit) value in reference to an 8 byte (64 bit) memory address.

The address stored in the address portion 201 of each cache line 203 may be a physical address, such as the actual memory address in the system memory 103). Alternatively, the address stored in the address portion 201 of each cache line 203 may be a virtual address, which an address that is assigned to the physical address to provide an abstraction. Such abstractions can be used, for example, to facilitate memory isolation between different processes executing at the processor 102. When virtual addresses are used, the processor 102 may include a translation lookaside buffer (TLB) 102f (usually part of a memory management unit (MMU)), which maintains mappings between physical and virtual memory address.

A shared cache 102b may include a code cache portion and a data cache portion. For example, when executing the application code 103a, the code portion of the shared cache 102b stores at least a portion of the processor instructions stored in the application code 103a and the data portion of the shared cache 102b stores at least a portion of data structures of the application runtime data 103b. Often times, a processor cache is divided into separate tiers/layers (e.g., layer 1 (L1), layer 2 (L2), and layer 3 (L3)), with some tiers (e.g., L3) potentially existing separate from the processor 102. Thus, the shared cache 102b may comprise one of these layers (L1), or may comprise a plurality of these layers.

When multiple cache layers are used, the processing units 102a interact directly with the lowest layer (L1). In most cases, data flows between the layers (e.g., on a read an L3 cache interacts with the system memory 103 and serves data to an L2 cache, and the L2 cache in turn serves data to the L1 cache). When a processing unit 102a needs to perform a write, the caches coordinate to ensure that those caches that had affected data that was shared among the processing units 102a don't have it anymore. This coordination is performed using a cache coherence protocol (discussed later).

Caches can be inclusive, exclusive, or include both inclusive and exclusive behaviors. For example, in an inclusive cache an L3 layer would store a superset of the data in the L2 layers below it, and the L2 layers store a superset of the L1 layers below them. In exclusive caches, the layers may be disjointed—for example, if data exists in an L3 cache that an L1 cache needs, the may swap content.

Each processing unit 102 also includes microcode 102c, which comprises control logic (i.e., executable instructions) that control operation of the processor 102, and which generally functions as an interpreter between the hardware of the processor and the processor instruction set architecture exposed by the processor 102 to executing applications. The microcode 102 may be embodied on on-processor storage, such as ROM, EEPROM, etc.

Registers 102d are hardware based storage locations that are defined based on the ISA of the processors(s) 102 and that are read from and/or written to by processor instructions. For example, registers 102d are commonly used to store values fetched from the shared cache 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102d may comprise "flags" that are used to signal some state change caused by executing processor instructions. In some embodiment, processors 102 may also include control registers, which are used to control different aspects of processor operation.

In some embodiments, the processor(s) 102 may include one or more buffers 102e. Buffer(s) 102e may be used as a temporary storage location for trace data. Thus, for example, the processors(s) 102 may store portions of trace data the buffer(s) 102e, and flush that data to the trace file(s) 104d at appropriate times, such as when there is available memory bus bandwidth.

As alluded to above, processors possessing a shared cache 102b operate the cache according to a CCP, or cache coherence protocol. In particular, CCPs define how consistency is maintained between data in the shared cache 102b and the backing data store (e.g., system memory 103 or another cache) as the various processing units 102a read from and write to data in the shared cache 102b, and how to ensure that the various processing units 102a always read valid data from a given location in the shared cache 102b.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in the shared cache 102b. A "modified" cache location contains data that has been modified in the shared cache 102b, and is therefore inconsistent with the corresponding data in the backing store (e.g., system memory 103 or another cache). When a location having the "modified" state is evicted from the shared cache 102b, the cache must write its data back the backing store. A "shared" cache location contains data that is unmodified from the data in the backing store, exists in read-only state, and is shared by the processing unit(s) 102a. The shared cache 102b can evict this data without writing it to the backing store. An "invalid" cache location contains no valid data, and can be considered empty and usable to store data from a cache miss. An "exclusive" cache location contains data that matches the backing store, and is used by only a single processing unit 102a. It may be changed to the "shared" state at any time (i.e., in response to a read request) or may be changed to the "modified" state when writing to it. An "owned" cache location is shared by two or more processing units 102a, but one of the processing units has the exclusive right to make changes to it. When that processing makes changes, it must notify the other processing units—since the notified processing units may need to invalidate or update based on the CCP implementation.

The granularity with which different CCPs track cache coherence can vary. For example, at one end of the spectrum, some CCPs track cache coherence per cache line as well as per processing unit, as shown in the example of FIG. 6 hereinafter (i.e., column 605). These CCPs can, therefore, track the state of each cache line as it relates to each processing unit. This means that a single cache line can have information about its state as it relates to each processing unit 102a. At the other end of the spectrum CCPs may track cache coherence at the level of the cache line only (i.e., they lack per-processing unit information). Processor manufacturers may choose to track cache coherence the level of the cache line only for efficiency, since only one processor can own a line exclusively (exclusive, modified, etc.) at a time. At a mid-level granularity, a CCP may track cache coherence per cache line, as well as an index (e.g., 0, 1, 2, 3 for a four-processing unit processor) to the processing unit that has the current cache line state.

The tracer 104a utilizes the processor's shared cache 102b to efficiently record a bit-accurate trace of execution of an application 104c and/or the kernel 104b. These techniques are built upon an observation that the processor 102 (including the shared cache 102b) form a semi- or quasi-closed system. For example, once portions of data for a process (i.e., code data and runtime application data) is loaded into the shared cache 102b, the processor 102 can run by itself—without any input—as a semi- or quasi-closed system for bursts of time. In particular, one or more of the processing units 102a execute instructions from the code portion of the shared cache 102b, using runtime data stored in the data portions of the shared cache 102b and using the registers 102d.

When a processing unit 102a needs some influx of information (e.g., because it needs code or runtime data not already in the shared cache 102b), a "cache miss" occurs and that information is brought into the shard cache 102b from the system memory 103. For example, if a data cache miss occurs when an executed instruction performs a memory operation at a memory address within the application runtime data 103b, data from that memory address is brought into one of the cache lines of the data portion of the shared cache 102b. Similarly, if a code cache miss occurs when an instruction performs a memory operation at a memory address application code 103a stored in system memory 103, code from that memory address is brought into one of the cache lines of the code portion of the shared cache 102b. The processing unit 102a then continues execution using the new information in the shared cache 102b until another cache miss occurs and new information is again brought into the shared cache 102b.

In order to record a bit-accurate representation of execution of an application, the tracer 104a can record sufficient data to be able to reproduce the influx of information into the shared cache 102b during execution of that application's thread(s). A first approach to doing this is to record all of the data brought into the shared cache 102b by logging all cache misses and un-cached reads (i.e., reads from hardware components and un-cacheable memory), along with a time during execution at which each piece of data was brought into the shared cache 102b (e.g., using a count of instructions executed or some other counter).

A second approach—which results in significantly smaller trace files than the first approach—is to track and record the cache lines that were "consumed" by each processing unit 102a. As used herein, a processing unit has "consumed" a cache line when it is aware of its present value. This could be because the processing unit is the one that wrote the present value of the cache line, or because the processing unit performed a read on the cache line. This second approach involves extensions to the shared cache 102b (e.g., one or more additional bits on each cache line, or reserved cache line(s) used for accounting) that enable the processor 102 to identify, for each cache line, one or more processing units 102a that consumed the cache line.

A third approach is to utilize the processor's CCP to determine a subset of "consumed" cache lines to record in the file(s) 104d, and which will still enable activity of the shared cache 102b to be reproduced. This third approach results in significantly smaller trace files—and thus significantly lower tracing overheads—than both of the first and second approaches.

Using the first and second recording approaches, it is straightforward to trace independent trace data streams that each corresponds to a different processing unit/thread. In these embodiments, data packets in each trace data stream may lack identification of the processing unit the data packet applies to, since this information is inherent based on the trace data stream itself. Additionally, if the computer system 101 includes multiple processors 102 (i.e., within different processor sockets), the trace file(s) could have a different trace data stream for each processing unit 102a in the different processors 102. In these embodiments, data packets for each processing unit 102a are generally recorded independent of other processing units, enabling different threads that executed at the different processing units 102a to be replayed independently. These trace files can, however, include some information—whether it be express or inherent—that provides a partial ordering among the different threads (e.g., that orders events such as accesses to shared memory).

When using the third approach (which relies on CCP's), however, it may be less straightforward to record trace data streams that are independently replayable. As mentioned, when using CCP data, a log for a given processing unit might rely on data that was read from or written by another processing unit. Since the tracer 104a utilizes CCP data, the trace file(s) 104 might include multiple trace data steams (i.e., for each processing unit), but there could be data dependencies between these trace data streams. Alternatively, the trace file(s) 104 might include a single trace data stream for all processing units 102a in the processor 102. In these traces, data packets might identify which particular processing unit the data packet applies to; but these packets may rely on data known by a different processing unit, creating data dependencies. If there are multiple processors 102 (i.e., multiple processor sockets, the trace file(s) 104 could include a separate trace data stream for each socket.

As mentioned, trace files can include some information that provides a partial ordering among the different threads. In particular, the tracer 104a may record additional data packets in the trace file(s) 104d in order to enhance logging of the ordering of operations across processing units. For example, the tracer 104a could record some events along with ordering information such as a monotonically incrementing numbers (MINs) (or some other counter/timer) in order to provide a full ordering of the events that have a MIN (or other counter/timer) across the threads. These MINs could be used to identify data packets corresponding to events that are defined to be "orderable" across threads. These events could be defined based on a "trace memory model" that defines how threads can interact through shared memory, and their shared use of data in the memory. As another example, the tracer 104a could (periodically or at random) record a hash of processor state based on a defined deterministic algorithm and a defined set of registers (e.g., program counter, stack, general purpose registers, etc.) As yet another example, the tracer 104a could (periodically or at random) forcefully log cache line data. As yet another example, the tracer 104a could include in the trace "transition" packets that log a hash all or a portion (e.g., a few bits) of data they implicitly carry. Thus, when this implicit data is reconstructed at replay, appropriate portions(s) of the implicit data can be hashed and matched to these transition packets to help identify its ordering. This may be useful, for example, if the CCP cannot track processor indexes associated with cache lines if the cache lines are in the shared state.

Figure 3:
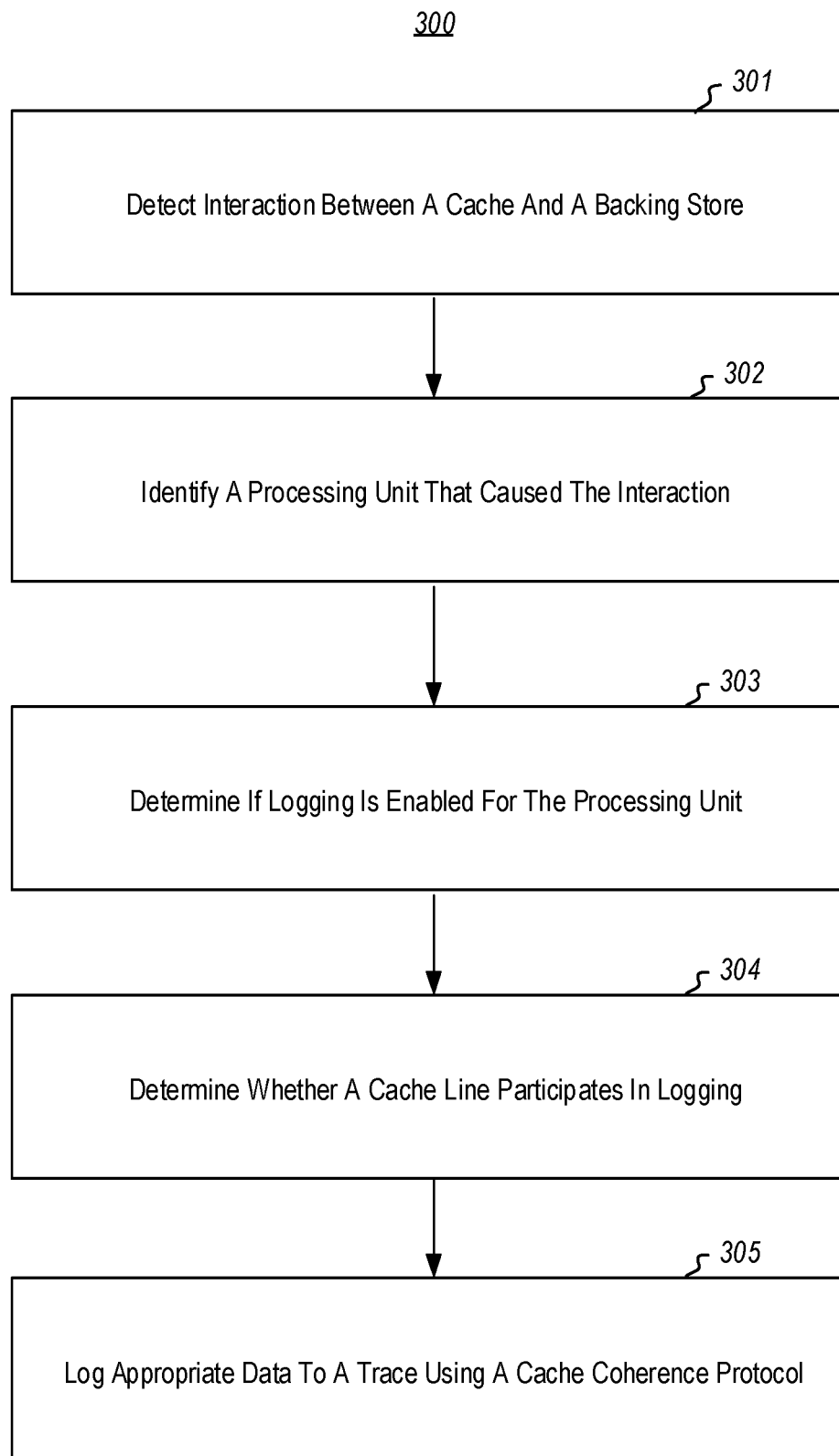
FIG. 3 illustrates a flowchart of an example method for performing a cache-based trace recording using CCP data.

Prior to discussing how to decouple trace data dependencies within CCP-based traces, it is instructive to understand in greater detail how recording a CCP-based trace could be performed. Accordingly, FIG. 3 illustrates a flowchart of a method 300 for performing a cache-based trace recording using CCP data. Method 300 may include acts that are performed by the processor 102 as the tracer 104a traces the application 104c and/or the kernel 104b. The actions made by the processor 102 may be based on hard-coded logic in the processor 102, soft-coded logic (i.e., microcode 102c), and/or another software application such as the tracer 104a, the kernel 104b, or a hypervisor.

As depicted, method 300 includes an act 301 of detecting interaction between a cache and a backing store. In some embodiments, act 301 comprises detecting an operation that causes an interaction between a particular cache line of a plurality of cache lines and one or more backing stores. For example, the while executing a thread of the application 104c or the kernel 104b at one of the processing units 102a, the processing unit can cause an interaction between a line in the shared cache 102b and a backing store (e.g., system memory 103, or another cache). The detection can be performed, for example, by the processor 102 based on executing its microcode 102c.

Method 300 also includes an act 302 of identifying a processing unit that caused the interaction. In some embodiments, act 302 comprises identifying a particular processing unit of the plurality of processing units that caused the operation. For example, based on executing the microcode 102c, the processor 102 can identify which of the processing units 102a caused the operation detected in act 301.

Method 300 also includes an act 303 of determining if logging is enabled for the processing unit. In some embodiments, act 303 comprises using a particular logging control bit associated with the particular processing unit to determine that logging is enabled for the particular processing unit. For example, the processor 102 can determine whether the processing unit identified in act 302 has logging enabled, based on a logging control bit. In some embodiments, the logging control bit is part of one of the registers 102d, such as a control register.

Method 300 also includes an act 304 of determining whether a cache line participates in logging. In some embodiments, act 304 comprises, based at least on logging being enabled for the particular processing unit, determining whether the particular cache line is a participant in logging. For example, the processor 102 can determine whether the cache line involved in the operation detected in act 301 is involved in logging. As will be discussed in greater detail later, there are several mechanisms that can be used for the detection, such as use of bits within the shared cache 102b, or use of cache way-locking.

Method 300 also includes an act 305 of logging appropriate data to a trace using a CCP. In some embodiments, act 305 comprises, based at least on logging being enabled for the particular processing unit, and on the particular cache line being a participant in logging, using the CCP to identify whether data is to be logged to a trace, the data usable to replay the operation, and when the data is to be logged to the trace, causing the data to be logged to the trace. For example, the processor 102 can consult its internal CCP state to what transitions in cache state occurred as a result of the operation, and if those transitions warrant logging data. When data is to be logged to the trace files(s) one or more data packets can be added to the appropriate trace data steams—such as a trace data stream that corresponds to the particular processing unit, or a trace data stream that corresponds to the processor 102 generally. If the appropriate trace data stream corresponds to the processor 102 generally, the one or more data packets may identify the particular processing unit. Note that if the trace data stream corresponds to the processor 102 generally, the inherent order of the data packets in the data stream itself provides some additional ordering information that may not be available if multiple data streams are used.

It is noted that when the shared cache 102b comprises multiple cache levels, in some embodiments method 300 operates at the cache level that interacts with system memory 103, since it is that cache level that processes the cache misses. Operating at this level enables cache activity of each processing unit 102a to be represented, without being redundant (i.e., representing a unit's activity more than once). Thus, for example, if the computer system 101 includes two processors 102 (i.e., two processor sockets) and comprises one "inclusive" L3 cache per socket, as well as "inclusive" L2 caches below the L3 cache, in some embodiments method 300 operates on the L3 caches. Method 300 can also operate at multiple cache levels. For example, if the computer system 101 includes one processor 102 (i.e., one processor socket) and comprises one "exclusive" L3 cache for the socket, as well as "inclusive" L2 caches below the L3 cache, it is the both the L3 and the L2 caches upon which method 300 might operate. Further examples of logging within caches exhibiting mixed inclusive/exclusive behaviors are discussed below.

As mentioned above in connection with act 304, there are several mechanisms that can be used by the processor 102 to determine whether a cache line is a "participant in logging." One is to extend each line of the shared cache 102b with one or more additional "accounting bits" that can be used as a flag, as processing unit identifiers, or as a processor index. Logic for controlling these "accounting bits" can be part of the processor's microcode 102c.

Figure 4A:
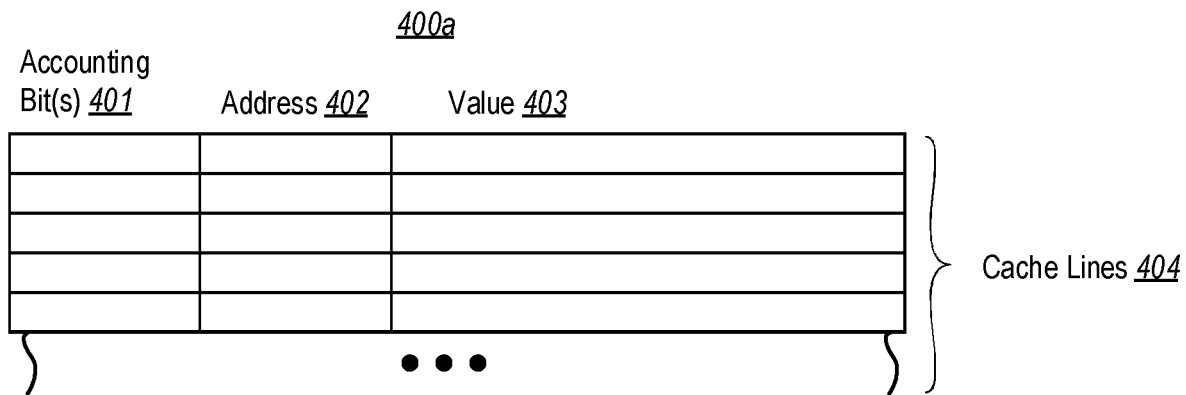
FIG. 4A illustrates an example shared cache that extends each of its cache lines with one or more additional accounting bits.

To illustrate this embodiment, FIG. 4A illustrates an example shared cache 400a, similar to the shared cache 200 of FIG. 2, that extends each of its cache lines 404 with one or more additional "accounting" bit(s) 401. Thus, each cache line 404 includes accounting bit(s) 401 and conventional address bits 402 and value bits 403.

In some implementations, each cache line's accounting bit(s) 401 comprise a single bit that functions as a flag (i.e., on or off) to by the processor 102 to indicate whether or not the cache line is participating in trace logging. If the processor's CCP has sufficient granularity (e.g., if the CCP tracks coherence state for each cache line either as it relates to each processing unit, or in reference to an index to a processing unit that owns the cache line's coherence state), this single bit can be sufficient to facilitate recording a robust fully-deterministic trace (i.e., one that guarantees full reconstruct-ability of the traced execution).

In other implementations, each line's accounting bit(s) 401 includes a plurality of bits. Pluralities of bits could be used in a couple of manners. Using one approach, referred to herein as "unit bits," each cache line's accounting bit(s) 401 can include a number of unit bits equal to a number of processing units 102a of the processor 102 (e.g., the number of logical processing units if the processor 102 supports hyper-threading). These unit bits can be used by the processor 102 to track which one or more particular processing unit(s) have consumed the cache line (or if the cache line has not been consumed, to note that none of the processing units have consumed it). Thus, for example, a shared cache 102b that is shared by two processing units 102a could include two unit bits for each cache line. In connection with these unit bits added to each cache line, embodiments extend the processor's microcode 102c to utilize these unit bits to track whether or not the current value in the cache line has been logged (i.e., in the trace file 104d) on behalf of each processing unit, or is otherwise known to the processing unit. If the processor's CCP has coarser granularity (e.g., if the CCP tracks coherence state at the level of the cache line only), these unit bits can provide additional information to facilitate a robust trace. For example, if a cache line is marked as shared or exclusive by the CCP, the unit bits can be used to identify which processing unit(s) share the cache line, or which processing unit has the exclusivity.

Using another approach, referred to herein as "index bits," each cache line's accounting bit(s) 401 can include a number of index bits sufficient to represent an index to each of the processing units 102a of the processor(s) 102 of computer system 101 that participate in logging, along with a "reserved" value (e.g., −1). For example, if the processor(s) 102 of computer system 101 included 128 processing units 102a, these processing units can be identified by an index value (e.g., 0-127) using only seven index bits per cache line. In some embodiments, one index value is reserved (e.g., "invalid") to indicate that no processor has logged a cache line. Thus, this would mean that the seven index bits would actually be able to represent 127 processing units 102a, plus the reserved value. For example, binary values 0000000-1111110 might correspond to index locations 0-126 (decimal), and binary value 1111111 (e.g., −1 or 127 decimal, depending on interpretation) might correspond to "invalid," to indicate that no processor has logged the corresponding cache line, though this notation could vary, depending on implementation. Thus, unit bits can be used by the processor 102 to track if the cache line is participating in trace logging (e.g., a value other than −1), and an index to a particular processing unit that consumed the cache line (e.g., the processing unit that most recently consumed it). This second approach has the advantage of supporting a great number of processing units with little overhead in the shared cache 102b, with the disadvantage of less granularity than the first approach (i.e., only one processing unit is identified at a time). Again, if the processor's CCP has coarser granularity (e.g., if the CCP tracks coherence state at the level of the cache line only), these index bits can provide additional information to facilitate a robust trace. For example, if a cache line is marked as shared or exclusive by the CCP, the index bits can be used to identify at least one processing unit that shares the cache line, or which processing unit is has the exclusivity.

Figure 4B:
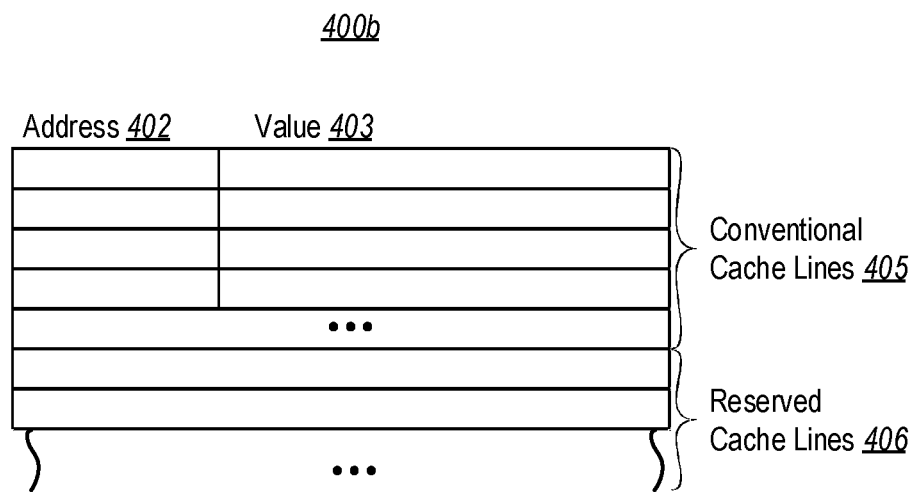
FIG. 4B illustrates an example of a shared cache that includes one or more reserved cache lines for storing accounting bits that apply to conventional cache lines.

Another mechanism that can be used by the processor 102 to determine whether a cache line is a participant in logging can employ the concepts discussed in connection with FIG. 4A, but without extending each cache line with additional accounting bits accounting bit(s) 501. Instead, this mechanism reserves one or more of the cache lines 404 for storing accounting bits. FIG. 4B illustrates an example of a shared cache 400b that includes conventional cache lines 405, that store memory addresses 402 and values 403, as well as one or more reserved cache line(s) 406 for storing accounting bits that apply to the conventional cache lines 405. The bits of the reserved cache line(s) 406 are allocated into different groups of accounting bits that each corresponds to a different one of the conventional cache lines 405. These groups of accounting bits could function as a flag bit, unit bits, or index bits, depending on implementation.

Another mechanism that can be used by the processor 102 to determine whether a cache line is a participant in logging is to utilize set-associative caches and way locking. Since a processor's shared cache 102b is generally much smaller than system memory 103 (often by orders of magnitude), and thus there are usually far more memory locations in the system memory 103 than there are lines in the shared cache 102b. As such, each processor defines a mechanism for mapping multiple memory locations of system memory to line(s) in a cache. Processors generally employ one of two general techniques: direct mapping and associative (or set-associative) mapping. Using direct mapping, different memory locations in system memory 103 are mapped to just one line in the cache, such that each memory location can only be cached into a particular line in the cache.

Figure 5:
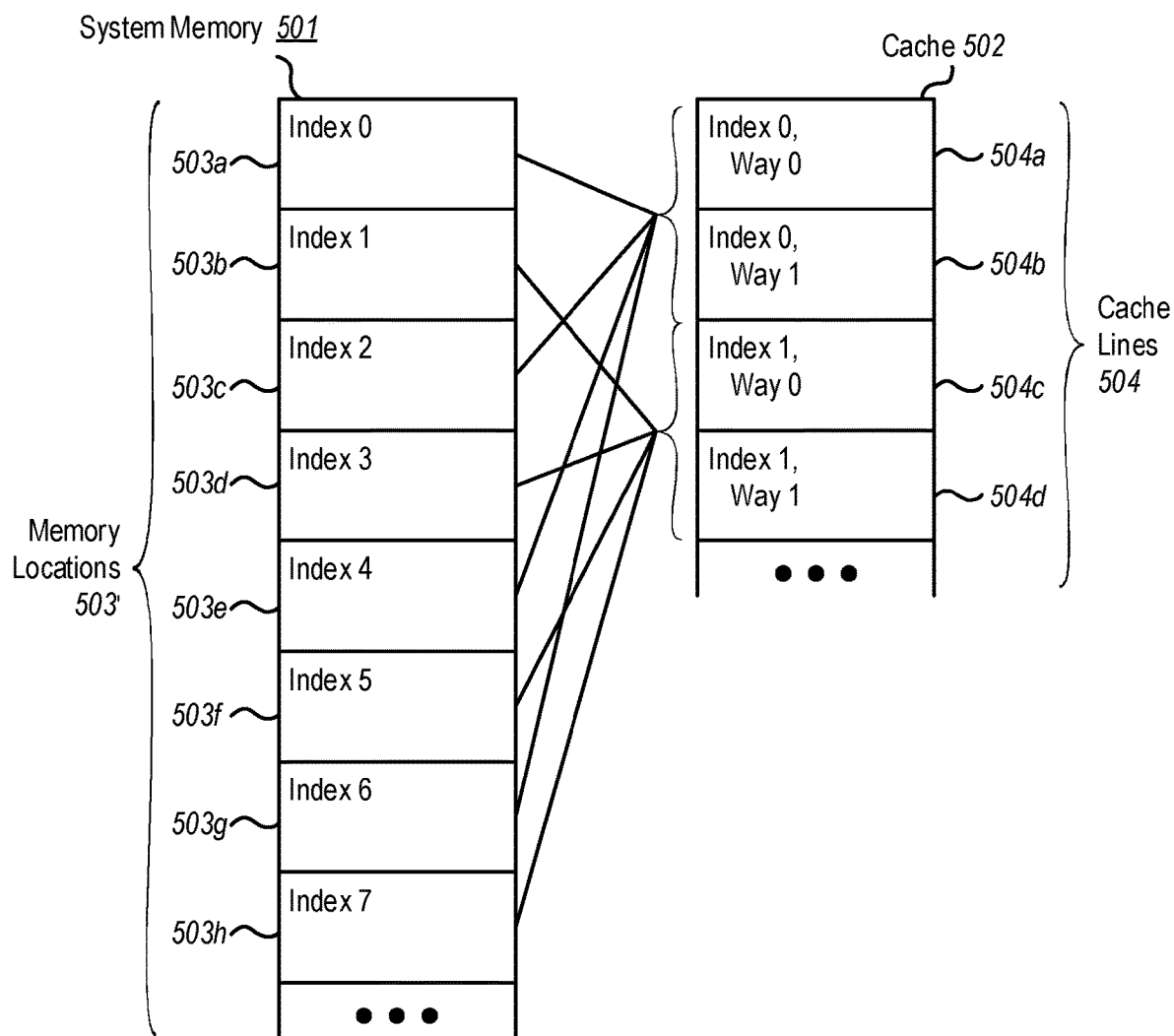
FIG. 5 illustrates an example of set-associative mapping.

Using set-associative mapping, on the other hand, different locations in system memory 103 can be cached to one of multiple lines in the shared cache 102b. FIG. 5 illustrates an example 500 of set-associative mapping. Here, cache lines 504 of a cache 502 are logically partitioned into different sets of two cache lines each, including a first set of two cache lines 504a and 504b (identified as index 0), and a second set of two cache lines 504c and 504d (identified as index 1). Each cache line in a set is identified as a different "way," such that cache line 504a is identified by index 0, way 0, cache line 504b is identified by index 0, way 1, and so on. As further depicted, memory locations 503a, 503c, 503e, and 503g (memory indexes 0, 2, 4, and 6) are mapped to index 0. As such, each of these locations in system memory can be cached to any cache line within the set at index 0 (i.e., cache lines 504a and 504b). The particular patterns of the depicted mappings are for illustrative and conceptual purposes only, and should not be interpreted as the only way in which memory indexes can be mapped to cache lines.

Set-associative caches are generally referred to as being N-way set-associated caches, where N is the number of "ways" in each set. Thus, the cache 500 of FIG. 5 would be referred to as a 2-way set-associative cache. Processors commonly implement N-way caches where N is a power of two (e.g., 2, 4, 8, etc.), with N values of 4 and 8 being commonly chosen (though the embodiments herein are not limited to any particular N-values or subsets of N-values). Notably, a 1-way set-associative cache is generally equivalent to a direct-mapped cache, since each set contains only one cache line. Additionally, if N equals the number of lines in the cache, it is referred to as a fully associative cache, since it comprises a single set containing all lines in the cache. In fully associative caches any memory location can be cached to any line in the cache.

It is noted that FIG. 5 represents a simplified view of system memory and caches, in order to illustrate general principles. For example, while FIG. 5 maps individual memory locations to cache lines, it will be appreciated that each line in a cache generally stores data relating to multiple addressable locations in system memory. Thus, in FIG. 5, each location (503a-503h) in system memory (501) may actually represent a plurality of addressable memory locations. Additionally, mappings may be between actual physical addresses in the system memory 501 and lines in the cache 502, or may use an intermediary layer of virtual addresses.

Set-associative caches can be used for determining whether a cache line is a participant in logging through use of way locking. Way-locking locks or reserves certain ways in a cache for some purpose. In particular, the embodiments herein utilize way-locking to reserve one or more ways for a thread that is being traced, such that the locked/reserved ways are used exclusively for storing cache misses relating to execution of that thread. Thus, referring back to FIG. 5, if "way 0" were locked for a traced thread, then cache lines 504a and 504c (i.e., index 0, way 0 and index 1, way 0) would be used exclusively for cache misses relating to execution of that thread, and the remaining cache lines would be used for all other cache misses. Thus, in order to determine whether a particular cache line is a participant in logging, the processor 102 need only determine whether the cache line is part of a way that is reserved for the thread that is being traced.

Figure 6A:
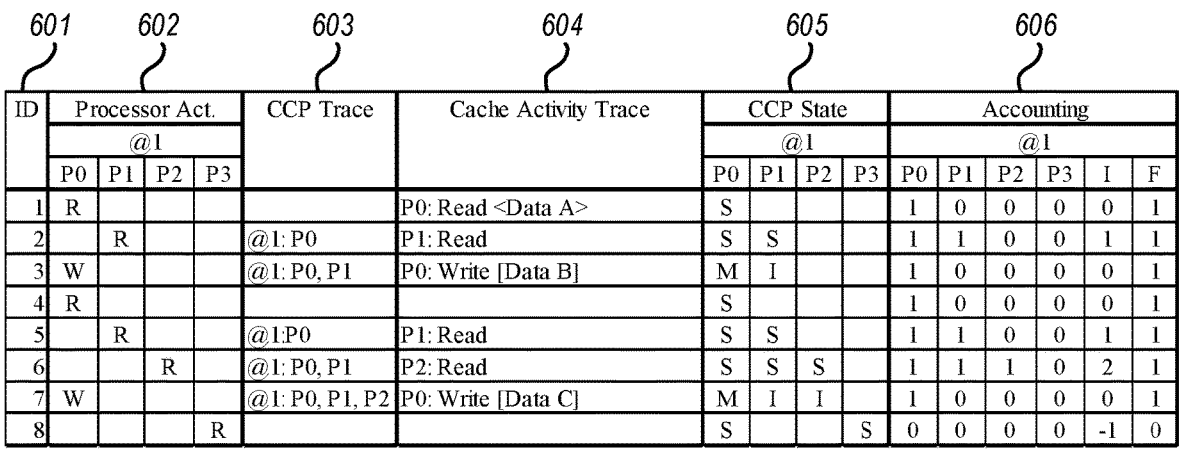
FIG. 6A illustrates an example of application of the method of FIG. 3.

FIG. 6A illustrates a concrete example of application of the method 300 of FIG. 3, in the context of FIGS. 1, 2, 4A, 4B, and 5. FIG. 6A illustrates a table 600a that includes a plurality of column groupings 601-606. Column 601 depicts an identifier (ID) that is used to specify a global order among the processor activity shown in column 602. Column 602 depicts read and write activity by four processing units 102a (i.e., P0-P3) on a memory address (@1) in the shared cache 102b. Column 603 depicts example CCP trace data that could be added to the trace file(s) 104d based on the processor activity in column 602, in order to log CCP dependencies. Column 604 shows example cache activity trace data that could be added to the trace file(s) 104d based on the activity in column 602, in order to log the processor's interaction with the memory address in the shared cache 102b. Column 605 depicts one embodiment of a processor's internal cache coherence state (e.g., as tracked using the processor's CCP) based on the processor activity in column 602. Column 606 depicts what might be stored in accounting bits of the shared cache 102b (as described in connection with FIGS. 4A and 4B), if accounting bits are used at all. While only one type of accounting bits would typically be used (i.e., unit bits per line, index bits per line, or a flag bit per line), for completeness in description column 606 shows each of unit bits (i.e., columns P0-P3), index bits (i.e., column "I"), and a flag bit (i.e., column "F").

For simplicity in description, table 600a depicts operations by only a single processing unit 102a at a time, but it will be appreciated that the principles described herein apply to situations in which there is concurrent activity (e.g., concurrent reads by two or more processing units of the same cache line). Additionally, examples described in connection with table 600a assume that tracking is enabled for processing units P0-P2, and is disabled for processing unit P3. For example, as discussed above, this could be controlled a bit corresponding to each processing unit, such a plurality of bits of a control register.

It is noted that this example uses simplified cache lines states that are derived from the cache line states (i.e., Modified, Owned, Exclusive, Shared, and Invalid) used in the CCPs discussed above (i.e., MSI, MESI, and MOESI). In this simplification, these states map to either a "read" state (i.e., the cache line has been read from) or a "write" state (i.e., the cache line has been written to). Table 1 below shows one example of these mappings. Note that these mapping are used as an example only, and are non-limiting. For example, there could exist CCPs and states other than the ones discussed herein, and one of ordinary skill in the art will recognize, in view of the disclosure herein, that similar mappings can be made with many different CCPs.

TABLE 1

| Protocol State | Mapped State |
| --- | --- |
| Modified | Write |
| Owned | Read |
| Exclusive | Write |
| Shared | Read |
| Invalid | No mapping - cache line considered empty |

While this example uses a global ID (i.e., column 601), it will be appreciated that in practice each processing unit would normally order operations using its own independent sets of identifiers. These IDs could comprise an instruction count (IC), or any other appropriate mechanism for specifying an ordering among operations, such as a "jump count" plus program counter. Thus, while a total order of events is easily reconstructed using the global ID in this example, in reality no such global order across processing units would typically be recorded, requiring use of the CCP trace data to identify possible orderings. Note that the example uses memory in a way that is consistent with the MSI, MESI, and MOESI CCPs, but for simplicity uses only the "modified," "shared," and "invalid" states. It is noted, however, that some CCPs could provide their own unique and/or monotonically-incrementing IDs that could also be recorded in a trace (e.g., in every packet, or in occasional packets) to strongly order trace entries. Even if the CCP doesn't provide such an ID, the value of a socket timer (e.g., TSC) or another predictable and orderable ID could potentially be used.

As shown in table 600a, at identifier ID1 processing unit P0 performed a read from address @1, which caused a cache miss to bring a data value (e.g., A) into a corresponding cache line. Column 605 shows that the processor's internal CCP state has the cache line "shared" by P0, and the accounting of column 606 shows that if unit bits are used they indicate that processing unit P0 has consumed (i.e., read) the cache line (and that processing units P1-P3 have not), that if index bits are used they indicate that P0 has consumed the cache line, and that if a flag bit is used it indicates that some processing unit has consumed the cache line.

Based on this accounting, in act 303 the processor 102 would determine that logging is enabled for P0. Additionally, in act 304 it would determine that the cache line participates in logging (i.e., using unit bits, index bits, flag bit, or way-locking). Thus, in act 305 the processor 102 would utilize the CCP to log appropriate data to the trace file(s), if necessary. Here, since the cache line is going from an invalid (empty) state to a read/shared state, cache activity trace data should be logged. Column 604 shows simplified cache activity trace data, indicating the processing unit (P0), if necessary (i.e., depending on whether the data packets are being logged to separate data steams per processing unit, or to a single data stream), and the data value (A) that was brought into the cache line. Although not shown for simplicity, other log data could include the cache line address (e.g. "@1") and the instruction count or some other count. Since P0 has logged the value that was read and there is no prior CCP state (i.e., P0 didn't "take" cache coherence for the cache line from any other processing unit), no CCP trace data (column 603) needs to be logged.

At ID2, column 602 shows that processing unit P1 performed a read from address @1. Column 605 shows that the processor's internal CCP state has the corresponding cache line as "shared" by P0 and P1. Column 606 shows that that both processing units P0 and P1 have consumed the cache line (unit bits), that P1 has consumed the cache line (index bits), or that some processing unit has consumed the cache line (flag bit). Note that it would also be correct for the index bits to still reference P0 instead of P1. Column 604 shows that in act 305 the processor 102 would have determined that a record of the operation could be logged. As shown, the processor 102 could note that P1 performed a read. Here, the value that was read is dependent on the value logged by P1 at ID0. Thus, column 603 includes CCP trace data indicating the P0 "took" the cache line of corresponding to @1 from P0 for the read.

At ID3 processing unit P0 performed a write to address @1(e.g., writing data value B). Column 605 shows that the processor's internal CCP state has the corresponding cache line as "modified" by P0 and "invalid" for P1. Column 606 shows that only processing unit P0 has consumed (e.g., updated the value of) the cache line (unit bits), that P0 has consumed the cache line (index bits), or that some processing unit has consumed the cache line (flag bit). Column 604 shows that, using the CCP, in act 305 the processor 102 determined that a record of the operation needed to be logged, since the cache line was written to/modified. As shown, the processor 102 could note that P0 performed a write, though the value written need not be logged. Column 603 includes CCP trace data indicating that P0 took the cache line from P0 and P1 for the write.

At ID4 processing unit P1 again performed a read from address @1. Column 605 shows that the processor's internal CCP state has the corresponding cache line as "shared" by P0, and column 606 shows that processing units P0 has consumed the cache line (unit bits), that P0 has consumed the cache line (index bits), or that some processing unit has consumed the cache line (flag bit). Columns 603 and 604 show that, using the CCP, in act 305 the processor 102 determined that no record of the operation needed to be logged, since P0 was reading the value it previously wrote.

At IDS processing unit P1 performed another read from address @1. Here, the internal CCP state 605 and cache accounting 606 are the same as they were at ID2, and the CCP log 603 and cache activity log 604 are the same as they were at ID2.

At ID6 processing unit P2 performed a read from address @1. Column 605 shows that the corresponding cache line is now "shared" by P0, P1, and P2, and column 606 shows that processing units P0, P1, and P2 have consumed the cache line (unit bits), that P2 has consumed the cache line (index bits), or that some processing unit has consumed the cache line (flag bit). Column 604 shows that P2 has read the cache line, and column 603 shows that P2 took the cache line from P0 and P1 for the read.

At ID7 processing unit P0 again performed a write to address @1 (e.g., writing data value C). Column 605 shows that the processor's internal CCP state has the corresponding cache line as "modified" by P0 and "invalid" for P1 and P2. Column 606 shows that only processing unit P0 has consumed the cache line (unit bits), that P0 has consumed the cache line (index bits), or that some processing unit has consumed the cache line (flag bit). Column 604 shows that the cache activity log indicates that P0 performed a write, though the value written need not be logged. Column 603 includes CCP trace data indicating that P0 took the cache line from P0, P1, and P2 for the write.

Finally, at ID8 processing unit P3 performed a read from address @1. The processor internally updated its internal CCP state (column 605) to indicate that cache line is "shared" by P0 and P3. It also updated its cache accounting (column 606) to show that no processing has consumed the cache line, since tracing is disabled for P3. Additionally, there is no CCP trace data (column 603) or cache trace data (column 604), since tracing is disabled for P3.

It is noted that, in order to generate fully deterministic trace file, a CCP would generally dictate that all processor activity that caused CCP transitions (i.e. write →read, write →write, read→write, and read→read) across processing units (e.g., from P0 to P1) be logged. However, activity that caused CCP transitions within the same processing unit (e.g., from P0 to P0) need not be logged. These need not be logged because they will be reproduced through normal execution of the thread that executed at that processing unit. This is demonstrated at ID4 above, where no CCP trace data (column 603) or cache activity trace data (column 604) was logged.

Using data such as that which is logged in the example above, and with further knowledge of the CCP used by the processor 102 at which the recording was made, a full ordering of the operations that occurred at each thread/processing unit can be reconstructed, and at least a partial ordering of the operations among the different processing units can be reconstructed. Thus, either an indexing processes (e.g., indexer 104*e*) and/or through a replay of the trace file (e.g., debugger 104*d*, each of the operations above can be reconstructed—even though they have not all been expressly recorded in the trace file(s) 104*d*.

As demonstrated by the CCP trace data (column 603) above, there are inter-thread dependencies on the value at address @1. As such, in its current form, the cache activity trace data (column 604) cannot be used to replay the activity of each logged processing unit (i.e., P0, P1, and P2) independently. Rather, they would need to be replayed together in a single-threaded fashion. In order to overcome this deficiency, embodiments herein can use the CCP data to decouple this trace data.

Figure 6B:
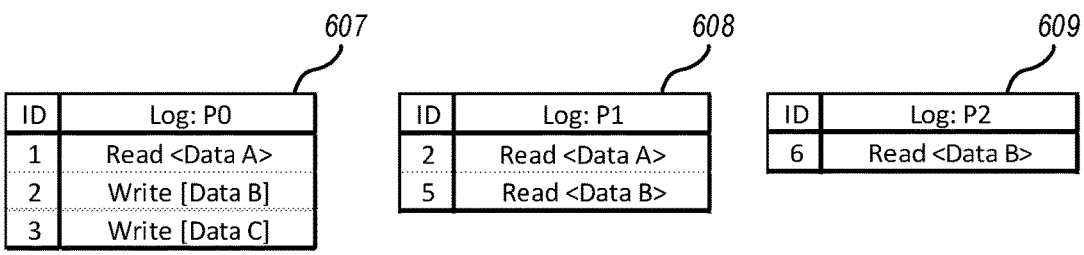
FIG. 6B illustrates example decoupled trace data streams corresponding to the example of FIG. 6A.

FIG. 6B illustrates example decoupled trace data streams 607, 608, and 609 corresponding to the logged processing units P0, P1, and P2, respectively. At a conceptual level, these decoupled trace data streams 607, 608, and 609 can be obtained by stepping through activity of each processing unit, individually. Note that while FIG. 6B shows fully independent trace data streams, this data could also be recorded in a single data stream, such as annotating or modifying the cache activity trace in columns 604.

First consider processing unit P0. The first cache activity trace data for P0 in table 600a is at ID1, where the processing unit performed a read from address @1 (obtaining memory value A). Since there were no prior CCP dependencies, this read (including its value) is logged, as shown in trace data stream 607. The next cache activity trace data for P0 is at ID3, where the processing unit performed a write to address @1 (writing memory value B). Here, there is a CCP dependency on the processing unit itself (P0) and a neighbor (P1) (i.e., it took the cache line for the write from P0 and P1). Since these CCP dependencies include P0, from P0's perspective there was no interruption in cache content between P0's read at ID1 and its write at ID3 (i.e., the cache content still had the value A just prior to P0 writing value B at ID3). Since P0 already knows the value that is being written at ID3 (i.e., since P0 is performing the write), there is no need to log the write—though it could optionally be logged with or without its value to provide richer log data (as shown in trace data stream 607). The final cache activity trace data for P0 is at ID7, where the processing unit performed another write to address @1 (writing memory value C). Again, the CCP dependencies include P0, so from P0's perspective there was no interruption in cache content between P0's write at ID3 and its write at ID7 (i.e., the cache content still had the value B just prior to P0 writing value C at ID7). Again, since P0 already knows the value that is being written at ID7, there is no need to log the write—though it could optionally be logged with or without its value to provide richer log data (as shown in trace data stream 607).

Next, consider processing unit P1. The first cache activity trace data for P1 in table 600a is at ID2, where the processing unit performed a read from address @1—though the cache activity trace data does not include the value that was read. The CCP trace data shows a dependency on P0 (i.e., P1 took the cache line from P0 for the read). Since there are two instances of P1 from P0 for a read (i.e., at ID2 and ID5) is not yet known whether P1 read the first value (i.e., A) or the second value (i.e., B). However, at ID3 the trace data for P0 shows that it took from P1 for a write. This means that one of the reads for P1 must be before this write by P0 at ID3. Since this is the first read in P1's trace, it must be the one that is before the write by P0 at ID3, and thus P1 must have read the value A at ID2. As shown in trace data stream 608, this value is logged directly in P1's decoupled trace. The only other cache activity trace data for P1 in table 600a is at ID5, where the processing unit performed another read from address @1, and again the cache activity trace data does not include the value that was read. While this read is after the prior read at ID2, it is not yet known if it is before the write by P0 at ID3. However, at ID7 the trace data for P0 shows that it took from P0, P1, and P2 for another write. This means that this second read for P1 must be before this write by P0 at ID7, and thus P1 must have read the value B at ID5.

As shown in trace data stream 608, this value is also logged directly in P1's decoupled trace.

Finally, consider processing unit P2. The only cache activity trace data for P2 in table 600a is at ID6, where the processing unit performed a read from address @1, but the cache activity trace data does not include the value that was read. The CCP trace data shows that it took the cache line from both P0 and P1 for the read, but we don't know if it read value A (i.e., from P0's read at ID1) or value B (i.e., from P0's write at ID3). However, at ID7 P0 took the cache line from P2 for a write. Thus, P2's read must have been before this write, and P2 thus read the value B.

In this simple example, the CCP trace included a fairly robust amount of data, including the identity each processing unit that a read or write took the cache line from. Some processors may not provide such rich information, or some tracers 104a may choose not to record such rich information (e.g., to reduce trace file size), leading to difficulty in decoupling the traces. For example, it is possible that some processing units will not be able to know if they took a cache line from themselves as part of marking the cache line for writing. It is also possible that a processing unit only knows one of the several other processing units that have a cache line shared when is asks for that same line (i.e., since it only needs the data once).

Furthermore, on taking a cache line for writing some processing units may only know the count of readers active at the time and one of the reads (itself, if it was a reader, another unit if it wasn't). Note that the count of readers is not necessarily the same as the count of readers that have logged the data into the trace. In this sense, the count is a maximum number of active readers, but since a cache line could have been evicted and re-imported there could have more logging units having read the address.

Additionally, if multiple processor sockets are participating in tracing, and a first processing unit takes a cache line from a second processing unit at a different socket, the trace data may identify that socket only, instead of the second processing unit itself In some embodiments, logging cache evictions and invalidations is optional. Not logging evictions/invalidation can complicate decoupling the data streams since it opens multiple logging scenarios for the same sequence of cache events on the same address. For example, if in table 600a the P2 had two entries like the existing one at ID6, it could be less straightforward to determine from the data where second entry belongs. With extra ordering information coming from either processing unit sharing a log, by having other cache lines accessed by the processing unit in the same log, and/or by logging CCP IDs, etc., the answer becomes easier to determine. Without this extra data one option is that the extra entry took place before the first write from P0 at ID3, if P2 had then evicted the cache line before P0 started to write the value 2. This is the case if the value was evicted from P2's cache before P0 did the write, so P0's logging never saw P2's entry. Another option is that extra entry took place right next to the existing one (i.e., just prior to the second write by P0 at ID7). This is the case if P0 evicted the data and then brought it back into the cache for reading it again before the write at ID7 (but after the already existing read).

Notably, CCP events are logically atomic and fully ordered within an address range (however, different address ranges are potentially independent from one another if they have dedicated buses or directories). Thus, each CCP entry provides an ordering of events with respect to some other CCP entries. This is in contrast to processor instructions themselves, which may be re-ordered by the processor at execution (e.g., since the processor may have a weak memory model). Note that, when decoupling data streams, it is sufficient to distinguish only among CCP orderings that generate different results, so distinguishing among equivalent orderings may not be needed. At a high level, this means ordering the periods of single writer and the periods of multiple readers across addresses.

FIG. 7 illustrates a more extensive example that includes activity by four processing units (P0, P1, P2, and P3) on three memory addresses (@1, @2, and A3), and in which the CCP trace data logs one of the readers and a total count of readers (e.g., because this is the only information the processor 102 provides, or the tracer 104a chooses to only record this information).

In particular, FIG. 7 depicts a table 700 that includes a column 701 showing global identifiers (similar to column 601), a column 702 showing processor activity across three memory addresses (similar to column 602), a column 703 showing CCP trace data (similar to column 603), and a column 704 showing cache activity trace data (similar to column 604). Similar to FIG. 6, processing units P0-P2 participated in logging, and P3 did not. As will be made apparent later, FIG. 7 has been specially-crafted to lack sufficient CCP trace data to fully decouple the traces; however, it illustrates how even very limited CCP trace data can be used to recover partial data and at least partially decouple the traces.

At ID1, P0 performed a read from address @1, reading data value A. This was logged in the cache activity trace along with the value. Since there was no prior CCP state for address @1, no CCP trace data was logged.

At ID2, P3 performed a read from address @2. Since P3 did not participate in logging, no trace data was recorded.

At ID3, P0 performed a read from address @2, reading data value B. This was logged in the cache activity trace along with the value. Since there was no prior CCP state for address @2, no CCP trace data was logged.

At ID4, P3 performed a read from address @3. Since P3 did not participate in logging, no trace data was recorded.

At ID5, P1 performed a read from address @1. This read was logged in the cache activity trace, but the value was not because it can be obtained from P0. Since P1 took the cache line of address @1 for a read from P0, this was logged in the CCP trace.

At ID6, P1 performed a write to address @2, writing data value C. This write was logged in the cache activity trace, though the value need not be logged. Since P1 took the cache line of address @2 for the write, and P0 had the value logged, this was noted in the CCP trace, along with a total prior reader count of two (i.e., P0 and P3).

At ID7, P3 performed a read from address @1. Since P3 did not participate in logging, no trace data was recorded.

At ID8, P2 performed a read from address @3, reading data value D. This was logged in the cache activity trace along with the value. Since there was no prior CCP state for address @3, no CCP trace data was logged.

At ID9, P1 performed a read from address @2. This read was logged in the cache activity trace, but the value was not because it can be obtained from P0. Since P1 took the cache line of address @2 for a read from P0, this was logged in the CCP trace.

At ID10, P0 performed a write to address @1, writing data value E. This write was logged in the cache activity trace, though the value need not be logged. Since P0 took the cache line of address @1 for the write, and P0 had the value logged, this was noted in the CCP trace, along with a total prior reader count of three (i.e., P0, P1, and P3).

At ID11, P3 performed a read from address @1. Since P3 did not participate in logging, no trace data was recorded.

At ID12, P1 performed a read from address @3. This read was logged in the cache activity trace, but the value was not because it can be obtained from P2. Since P1 took the cache line of address @3 for a read from P2, this was logged in the CCP trace.

At ID13, P2 performed a write to address @2, writing data value F. This write was logged in the cache activity trace, though the value need not be logged. Since P2 took the cache line of address @2 for the write, and that value was available from P0, this was noted in the CCP trace, along with a total prior reader count of two (i.e., P0 and P1).

At ID14, P1 performed a read from address @1. This read was logged in the cache activity trace, but the value was not because it can be obtained from P0. Since P1 took the cache line of address @1 for a read from P0, this was logged in the CCP trace.

At ID15, P1 performed a read from address @2. This read was logged in the cache activity trace, but the value was not because it can be obtained from P2. Since P1 took the cache line of address @2 for a read from P2, this was logged in the CCP trace.

At ID16, P2 performed a read from address @1. This read was logged in the cache activity trace, but the value was not because it can be obtained from P0. Since P2 took the cache line of address @1 for a read from P0, this was logged in the CCP trace.

At ID17, P2 again performed a read from address @1. This read was logged in the cache activity trace, but the value was not because it can be obtained from P0. Since P2 took the cache line of address @1 for a read from P0, this was logged in the CCP trace.

At ID18, P1 performed a write to address @3, writing data value G. This write was logged in the cache activity trace, though the value need not be logged. Since P1 took the cache line of address @3 for the write, and P1 had the value logged, this was noted in the CCP trace, along with a total prior reader count of three (i.e., P1, P2, and P3).

At ID19, P0 performed a write to address @1, writing data value H. This write was logged in the cache activity trace, though the value need not be logged. Since P0 took the cache line of address @1 for the write, and the value was available from P0, this was noted in the CCP trace, along with a total prior reader count of three (i.e., P1, P2, and P3).

At ID20, P0 performed a read from address @3. This read was logged in the cache activity trace, but the value was not because it can be obtained from P1. Since P1 took the cache line of address @3 for a read from P1, this was logged in the CCP trace.

The example of table 700 includes insufficient granularity of CCP data to be able to step through each processing unit and obtain fully decoupled traces, as was done previously in connection with table 600a. Instead, the dependencies can be resolved mathematically, such as by developing solving a system inequalities, and/or by developing a directed graph and resolving cycles, if necessary.

Figure 8:
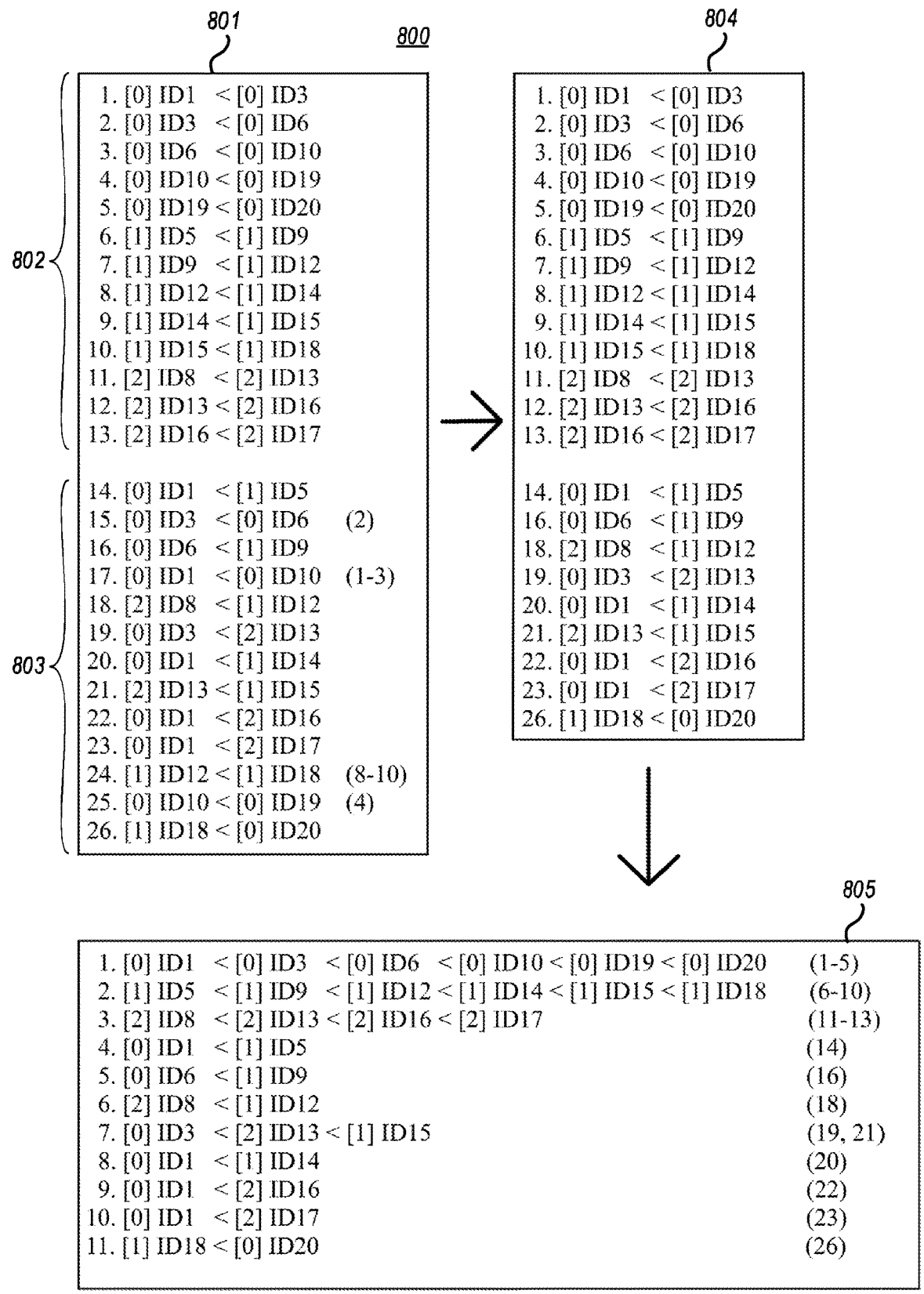
FIG. 8 illustrates an example of developing a system inequalities for the CCP-based log of FIG. 7.

FIG. 8 illustrates an example 800 of developing a system inequalities. Initially, box 801 includes a group 802 of inequalities derived from per-core activity, and a group 802 of inequalities derived from CCP interactions. Initially, with respect to group 802, inequalities 1-5 are derived from P0. In particular, inequality 1 shows that the read by P0 at ID1 is before the read by P0 at ID3; inequality 2 shows that the read by P0 at ID3 is before the write by P0 at ID6; inequality 3 shows that the write by P0 at ID6 is prior to the write by P0 at ID10, and so on. In a similar manner, inequalities 6-9 are derived from P1, and inequalities 10-13 are derived from P2.

With respect to group 803, each inequality corresponds to a CCP trace data entry in column 703. For example, the CCP trace entry at IDS corresponds to inequality 14, and requires that the read by P0 at ID1 of address @1 is before the read by P1 at IDS of the same address. The CCP trace entry at ID6 corresponds to inequality 15, and requires that the read by P0 at ID3 of address @2 is before the write by P0 at ID6 of the same address. As indicated parenthetically, this inequality is the same as inequality 2. Continuing, the CCP trace entry at ID9 corresponds to inequality 16, and requires that the write by P0 at ID6 to address @2 is before the read by P1 at ID of the same address. The remaining inequalities (i.e., 17-26) in group 803 are derived from the CCP entries at ID10 and ID12-20, respectively.

As shown, several of the inequalities in groups 802 and 803 overlap, and thus redundancies can be removed to reduce the number of inequalities. Block 804 shows such reduction, which removes the inequalities from group 803 overlapped with those in group 802.

Finally, block 805 shows a new set of inequalities that are further reductions of those in block 804. As shown, new inequalities 1-3 correspond to inequalities 1-13 that were derived from processing unit activity (i.e., new inequality 1 is equivalent to inequalities 1-5 of block 804, new inequality 2 is equivalent to inequalities 6-10 of block 804, etc.). New inequalities 4-11 correspond to inequalities 14, 16, 18, 19, 20-23, and 26 that were derived from CCP activity, with a reduction of inequalities 19 and 21 into new inequality 7.

Block 805 is a system of inequalities to which linear programming algorithms, such as the simplex algorithm, can be applied in order to identify the ordering of events, and hence deduce which data to place in the trace. In order to find a solution, this may mean transforming one or more of the inequalities into a case where the two sides are equal (e.g., transform "[0] ID1<[1]ID5" into "[0] ID1+1<=[1] ID5").

Figure 9:
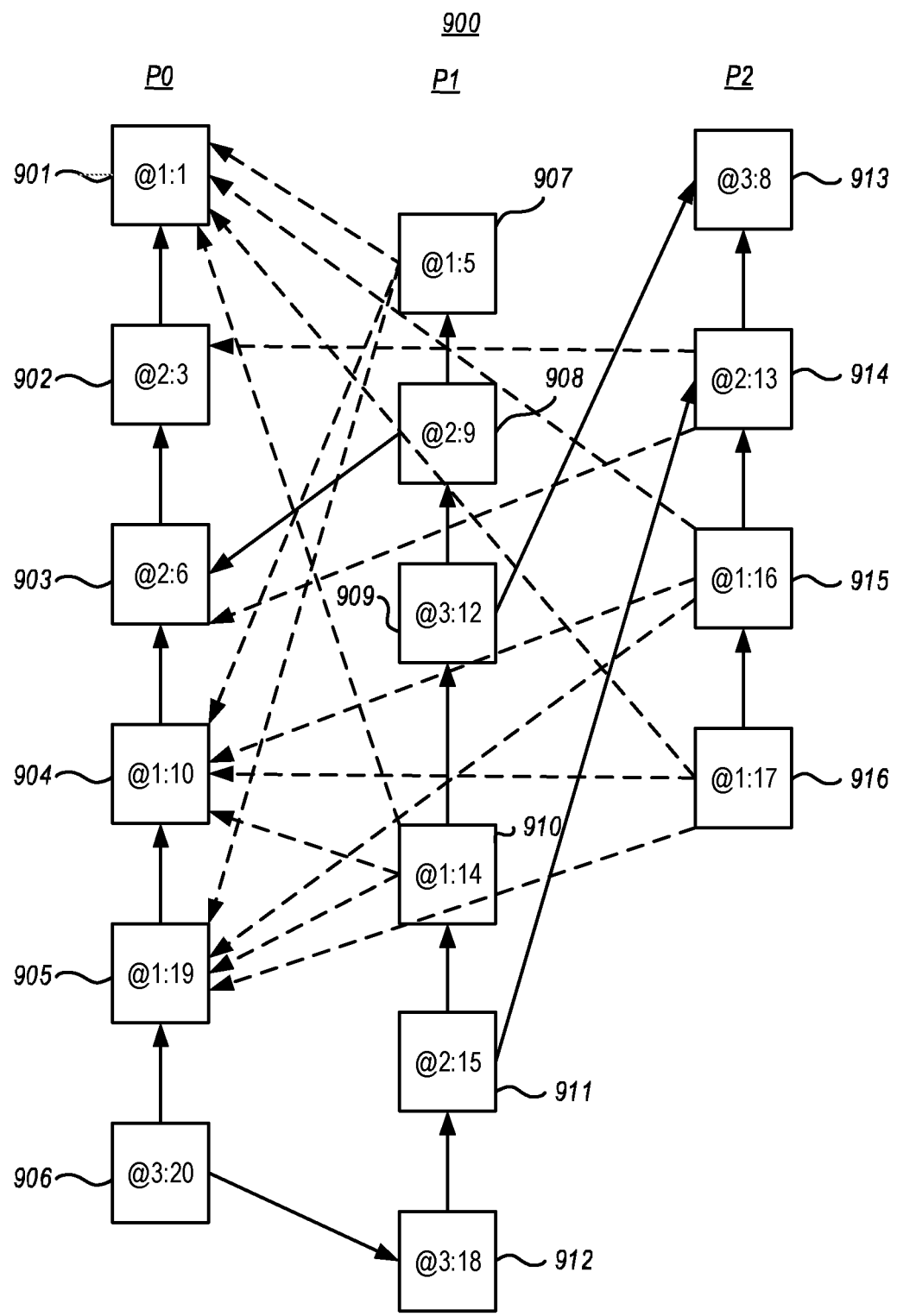
FIG. 9 illustrates an example of a graph that could be developed from the CCP-based log of FIG. 7.

As mentioned, dependencies can also be resolved by developing a directed graph and resolving cycles, if necessary, to generate decoupled traces for each processing unit. FIG. 9 illustrates an example of a graph 900 that could be developed from table 700 by stepping through each processing unit individually. Graph 900 includes a plurality of nodes 901-916, each corresponding to processor activity in column 702, and which are arranged in columns per-processing unit (i.e., nodes 901-906 for P0, nodes 907-912 for P1, and nodes 913-916 for P2). Each node indicates the memory address involved and the identifier of the event from column 701. The nodes are connected by solid black arrows if a dependency is known, and dashed arrows if there are multiple possibilities for a dependency.

Looking initially at the activity of P0, nodes 901-906 represent each action of P0, arranged in-order based on their respective order within P0 (much like inequality 1 of block 805). These nodes are connected by solid arrows to indicate these inherent inter-processor dependencies. FIG. 10 depicts an example 1000 of decoupled data streams, including a decoupled data stream 1001 that can be developed for P0 based on the graph. First, at ID1 (node 901), P0 performed a read from address @1, and the data read was logged so the value is known. Data stream 1001 reflects this log entry. Next, at ID3 (node 902), P0 performed a read from address @2. Again, the data read was logged, so the value is known, and data stream 1001 reflects this log entry. Next, at ID6 (node 903), P0 performed a write to address @2. Per the CCP trace, this was a dependency in the same processing unit (i.e., as shown with the solid arrow from nodes 903 to 902) and it was a write, so there is nothing to log in decoupled data stream 1001. However, the value (data C) can be remembered for use in the decoupled data streams for other processing units. ID10 (node 904) and ID19 (node 905) are similar to ID6, and nothing needs to be logged in decoupled data stream 1001. Finally, at ID20 (node 906), P0 performed a read from address @3. Per the CCP trace, this read takes dependence on P1, which would be the write the same address at ID18 (node 912). A solid arrow from node 906 to node 912 shows this dependency. The data that was produced by P1 at ID18 (i.e., data G) is logged in decoupled data stream 1001. The asterisk in this entry of decoupled data stream 1001 indicates that this is newly logged data, and a resolved dependency. This data value might be filled into decoupled data stream 1001 in a second pass, or by performing the foregoing analysis of all processing units in parallel.

Now turning to P1, at IDS (node 907), P1 performed a read from address @1, and the value was not logged. Per the CCP trace, this read had a dependency on address @1 from P0—but it could be at ID1 (node 901), ID10 (node 904), or ID19 (node 905). As such, graph 900 shows dashed arrows from node 907 to each of nodes 901, 904, and 905. Based on this partial information, FIG. 10 shows a decoupled data steam 1002 for P2 including the read, but not the value. Next, at ID9 (node 908), P0 performed a read from address @2, and the value was not logged. Per the CCP trace, this has a dependency on address @2 from P0, coming from P0's write at ID6 (node 903), so this is the only candidate for the value. As such, graph 900 shows a solid arrow from node 908 to node 903. While this doesn't disambiguate IDS (node 907), it does indicate that ID6 (node 903) occurs before ID9 (node 908). As shown in decoupled data stream 1002, the data value—C—can now be logged, and as indicated by the asterisk it is newly logged data, and a resolved dependency. Next, at ID12 (node 909) the read has a dependency on P2, which is ID8 (node 913). This is captured with the solid arrow from node 909 to node 913, and the value (data D) can be added to decoupled data stream 1002. Again, this is newly logged data, and a resolved dependency. At ID14 (node 910) there is a dependency on P0 at address @1, much like IDS, which could again be ID1 (node 901), ID10 (node 904), or ID19 (node 905). As such, graph 900 shows dashed arrows from node 910 to each of nodes 901, 904, and 905. At ID15 (node 911) the read has a dependency on P2, which is the write at ID13 (node 914). This is captured with the solid arrow from node 911 to node 914, and the value (data F) can be added to decoupled data stream 1002. Again, this is newly logged data, and a resolved dependency. At ID18 (node 912) the write is to the same processing unit (P1), so there is nothing to log (though the value written—data G—can be retained for later use).

Turning to P2, at ID8 (node 913) P2 performed a read from address @3. This data was value was already logged, and is reflected by FIG. 10 in a decoupled data stream 1003 for P2. Next, at ID 13 (node 914) P2 performed a write to address @2. Per the CCP trace, this takes a dependency on P0, which could be at ID3 (node 902) or ID6 (node 902), as reflected by the dashed arrows from node 914 to nodes 902 and 903. Since this write is not dependent on itself, it is added to decoupled data stream 1003. At ID 16 (node 915) P2 performs read from address @1, and per the CCP trace takes a dependency on P0 on that address. This could be on ID1 (node 901), ID10 (node 904), or ID19 (node 905), as reflected by the dashed arrows between node 915 and those nodes. Decoupled data stream 1003 shows that the read is logged, but the value is not known. ID17 (node 916) was also a read by P2 from address @1, and thus the graph 900 shows dependence on nodes 901, 904, and 905, and decoupled data stream 1003 shows that the read is logged, but the value is not known.

While the CCP trace data of table 700a lacked sufficient information to fully decouple the traces, there are still techniques that could be used to infer actual dependencies if these unlikely situations were to arise. For example, heuristics could consider the instruction distance across entries in the log. For instance, the distance between ID19 (node 905) and ID10 (node 904), between ID1 (node 901) and ID10 (node 904), and between ID13 (node 914) and ID16 (node 915) may be used to guess (and later validate) which node is more likely to provide a value to ID16, ID19 or ID1.

Figure 11A:
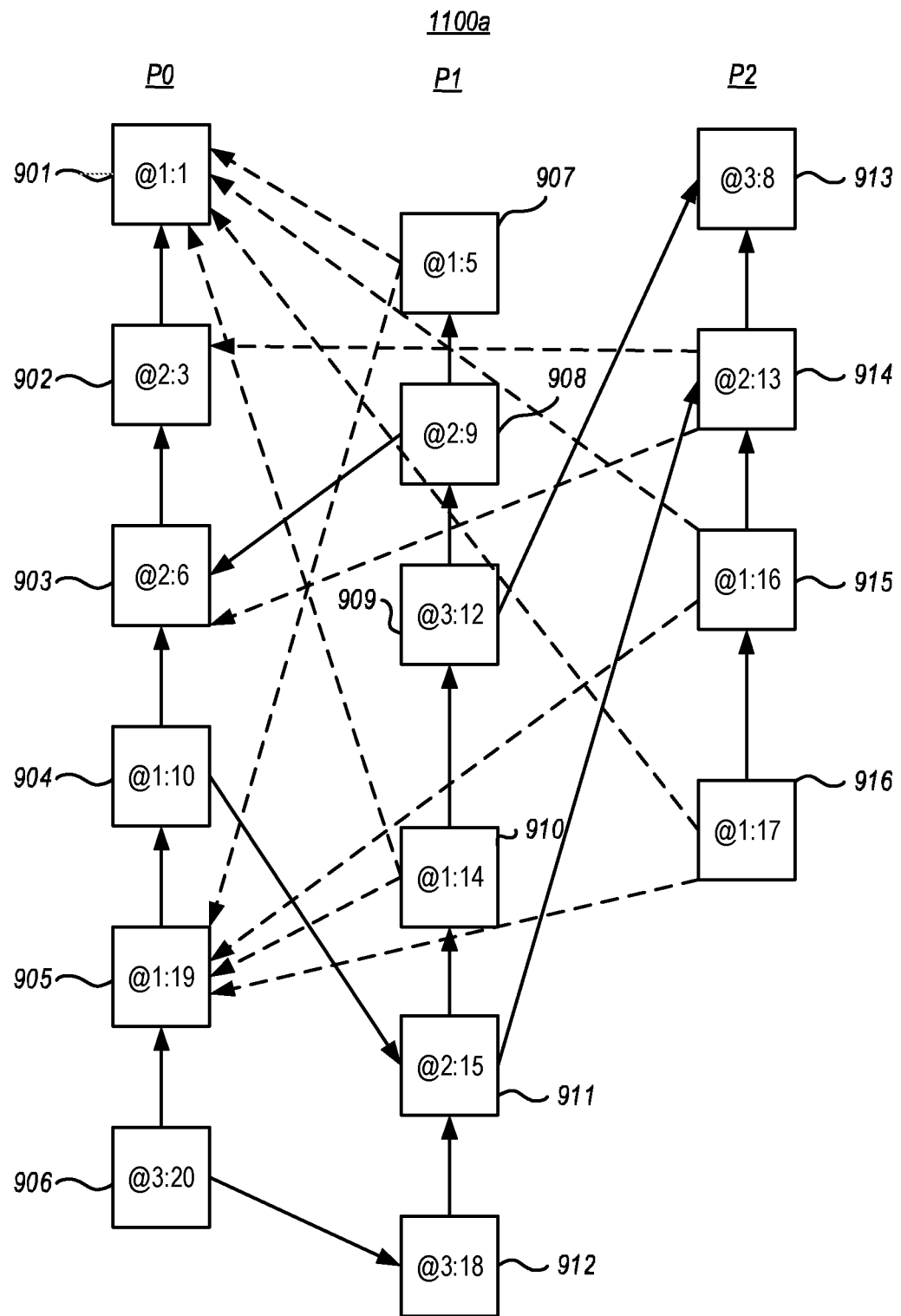
FIGS. 11A and 11B illustrate updates to the graph of FIG. 7 as cycles are removed.
Figure 11B:
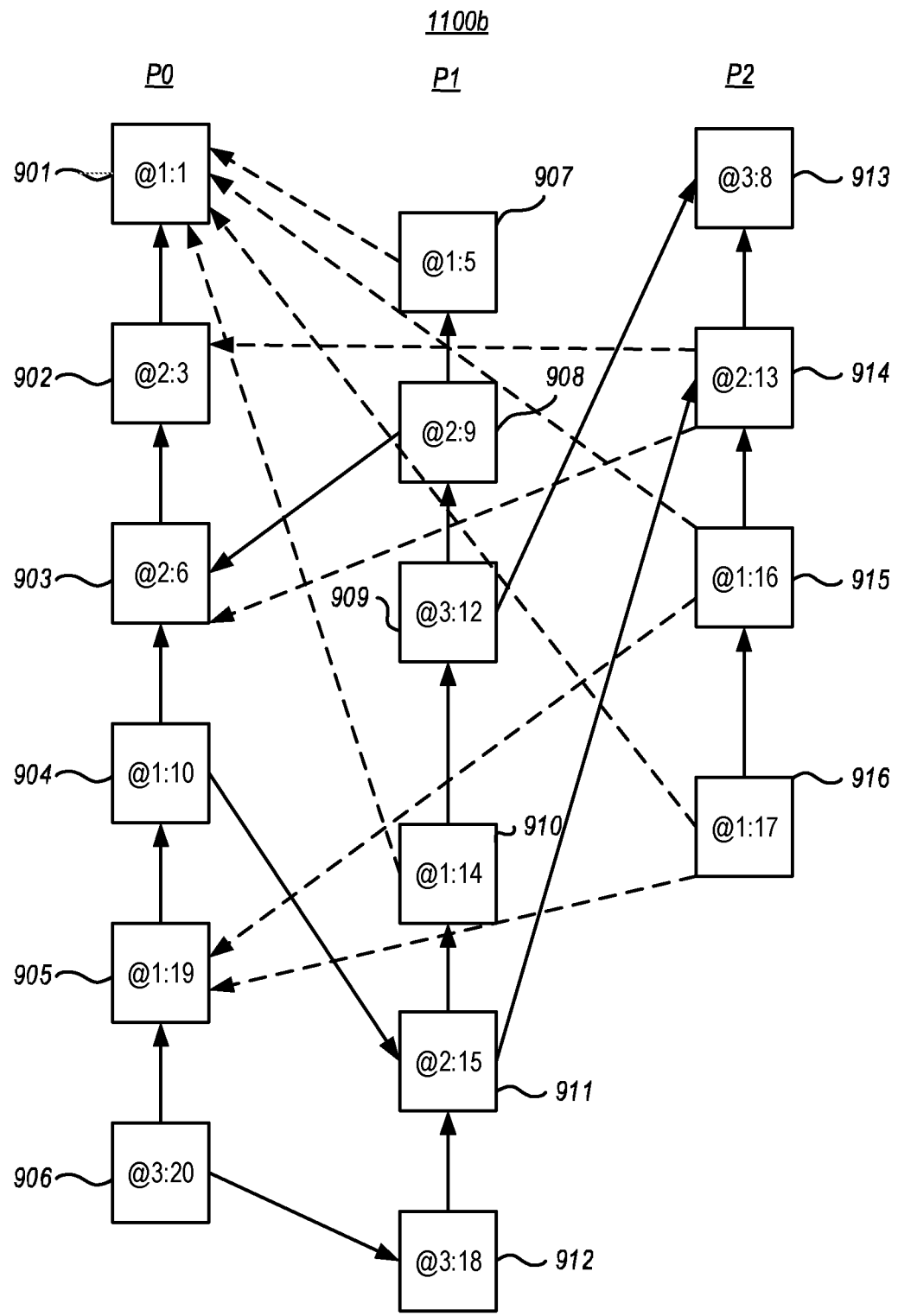

As mentioned, some dependencies may be resolved by eliminating cycles in the graph. To illustrate this, suppose that at ID10 (node 904) P0 had instead performed a read from address @2, taking a CCP dependency from P1 at ID15 (node 911). This would remove the dashed arrows coming to node 904 from nodes 907, 910, 915, and 916, and introduce a new solid arrow from node 904 to node 911. FIG. 11A shows an updated graph 1100a reflecting these changes. This new graph 1100 now has cycles. For example, if node 907 (ID5) took data from node 905 (ID19), there is a cycle (i.e., nodes 907, 905, 904, 911, and back to 907). The lines that create this cycle are the dashed line from node 907 to node 905, and the dashed line from node 910 to node 905. FIG. 11B shows another updated graph 1100b that removes these dashed lines. While we cannot yet determine which arrow is correct between node 905 and nodes 915 and 916, eliminating cycles has made progress in removing dependencies.

Figure 12:
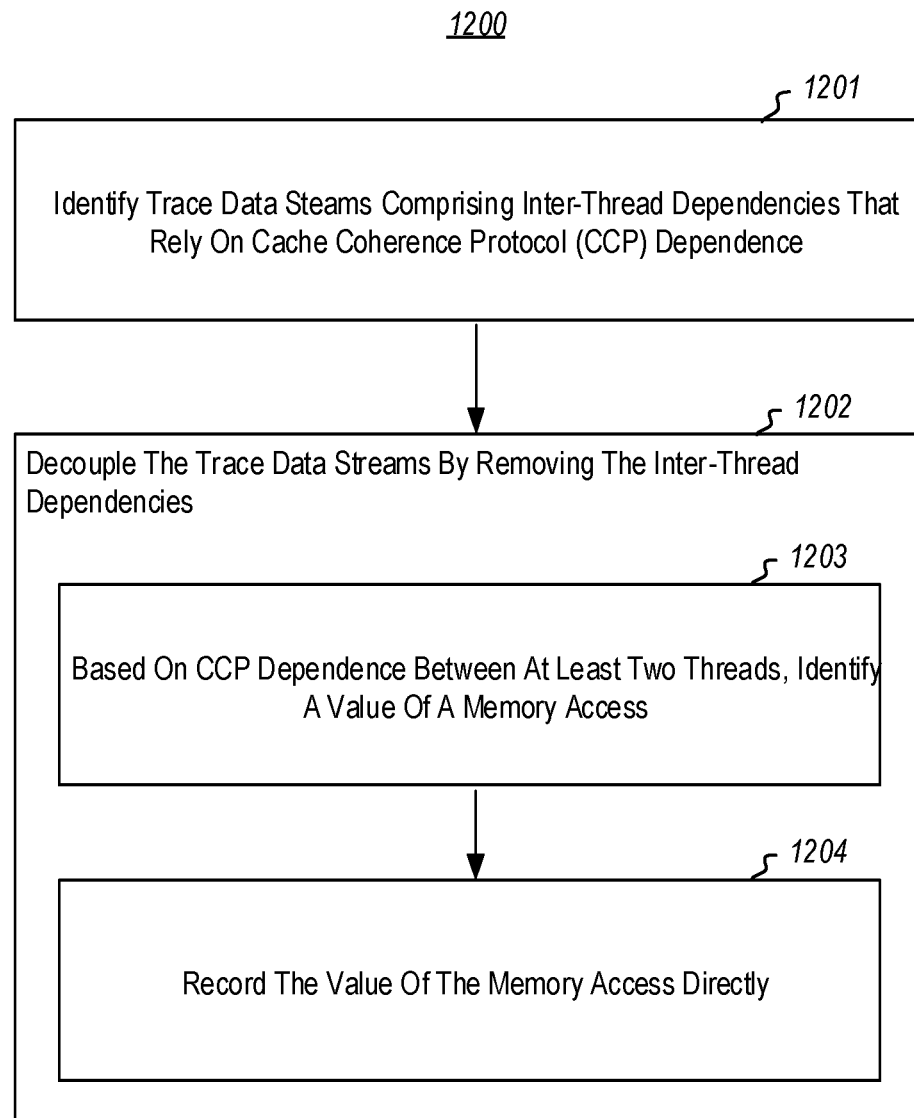
FIG. 12 illustrates a flowchart of an example method for decoupling trace data streams using CCP data.

In view of the foregoing, FIG. 12 illustrates a flowchart of an example method 1200 for decoupling trace data streams using CCP data. Method 1200 is described in the context of the computing environments and examples of FIGS. 1-11.

As shown, method 1200 includes an act 1201 of identifying trace data streams comprising inter-thread dependencies that rely on CCP dependence. In some embodiments, act 1201 comprises identifying, within a trace of a prior execution of an application, one or more trace data streams that log execution of a plurality of threads during the prior execution of the application, the one or more trace data streams including cache activity trace data and CCP trace data, the cache activity trace data including one or more inter-thread data dependencies comprising one or more dependent cache activity trace entries that each records a corresponding memory access by a corresponding thread in reliance on traced CCP dependence between threads. For example, the indexer 104e could identify CCP trace data (column 603) and cache activity trace data (column 604) that record execution of three threads executing at P0, P1, and P2, and which access a single memory address, and which are logged in trace file(s) 104d. As discussed, the CCP trace data indicates partial cache coherency dependency information, which logs inter-thread data dependencies. In this example, the CCP trace data is fairly robust, listing each processing unit on which there was a dependency. In another example, the indexer 104e could identify CCP trace data (column 703) and cache activity trace data (column 704) that record execution of three threads executing at P0, P1, and P2. In this example, the CCP trace data is less robust, listing only a single processing unit on which there is a dependency, and a total reader count.

In some embodiments, the cache activity trace data is based at least on a subset of processor data cache misses caused by a plurality of threads during the prior execution of application 103c at processor(s) 102, as recorded by the tracer 104a. In addition, the CCP trace data is based at least on a subset of cache coherence state changes that occurred due to the processor data cache misses in the shared cache 102b caused by the plurality of threads during the prior execution of the application, and as recorded by the tracer 104a.

Method 1200 also includes an act 1202 of decoupling the trace data steams by removing inter-thread dependencies. In some embodiments, act 1201 comprises removing the one or more inter-thread data dependencies, to create independent cache activity trace data for each of the plurality of threads that enables each thread to be replayed independently. For example, the indexer 104e can process the CCP trace data (column 603) and cache activity trace data (column 604) to decouple the trace data for P0, P1, and P2. This may include recording fully independent new data streams for each processor, or annotating and/or modifying the existing cache activity trace data (column 604). In another example, indexer 104e can process the CCP trace data (column 703) and cache activity trace data (column 704) to decouple the trace data for P0, P1, and P2, recording fully independent new data streams for each processor, or annoying and/or modifying the existing cache activity trace data (column 604).

The particular process for removing the one or more inter-thread data dependencies can vary. For example, the indexer 104e may step through each thread individually, such as was shown in connection with FIG. 6B, to identify appropriate values and dependencies along the way. The indexer 104e could also step through the threads in parallel. This could involve pausing stepping through a first thread when data is needed, stepping through a second thread until that data is found, and resuming the first thread using the found data. This could also involve skipping over a data dependency within a first thread when data is not available, and filling it in on a second pass when it is found in another thread. Removing the one or more inter-thread data dependencies could also involve solving the dependencies mathematically, such as by developing and solving a system of inequalities and/or developing and solving a graph.

In some embodiments, removing the one or more inter-thread data dependencies involves stepping through the threads (individually or in parallel) to fill in as much data as can be found, possibly in an iterative fashion. When this process is complete, there may still be unresolved dependencies. These can then be resolved by forming a system of inequalities for the remaining dependencies and solving those dependencies, and/or creating and solving a graph.

In view of the foregoing, removing the one or more inter-thread data dependencies could include one or more of: (i) iteratively replaying one or more portions of the plurality of threads, in which each iteration includes replacing at least one dependent cache activity trace entry with an independent cache activity trace entry that stores a memory value directly; (ii) based on the traced CCP dependence between threads, identifying a system of inequalities expressing the one or more inter-thread data dependencies, and identifying an ordering of memory access events based on solving the system of inequalities; or (iii) based on the traced CCP dependence between threads, identifying a directed graph expressing the one or more inter-thread data dependencies and identifying an ordering of memory access events based on the one or more inter-thread dependencies in the directed graph.

As shown, act 1202 can include an act 1203 of, based on CCP dependence between at least two threads, identifying a value of a memory access. In some embodiments, act 1203 comprises, for each dependent cache activity trace entry, and based on the traced CCP dependence between threads, identifying a corresponding value of the corresponding memory access by the corresponding thread. For example, using the techniques described above (i.e., replaying each thread singly or in parallel, and potentially iteratively; developing a system of equations; or developing a graph), indexer 104e can identify a value for each memory access that had been recorded by reference previously.

Thus, act 1202 can include one or more of (i) replaying the corresponding thread to the point of the corresponding memory access, and based on the traced CCP dependence between threads, replaying at least one other thread upon which the corresponding memory access is dependent to identify the corresponding value; (ii) while replaying the corresponding thread, skipping replay of the corresponding memory access, and based on the traced CCP dependence between threads, replaying at least one other thread upon which the corresponding memory access is dependent to identify the corresponding value; or (iii) based on the traced CCP dependence between threads, identifying that the corresponding memory access by the corresponding thread is dependent on a memory operation by another thread, and identifying the corresponding value based on cache activity trace data for the other thread.

Act 1202 can also include an act 1204 of recording the value of the memory access directly. In some embodiments, act 1204 comprises, for each dependent cache activity trace entry, recording the corresponding value of the corresponding memory access on behalf of the corresponding thread. For example, the tracer can record an independent data stream of for each thread (e.g., FIGS. 6B and 10), or could annotate or modify an existing data stream to include the new data.

If data packets for multiple threads are recorded into a single data stream, then recording the corresponding value of the corresponding memory access on behalf of the corresponding thread could comprise recording the corresponding value into a data packet identifies at least one of: a processing unit that executed the corresponding thread, or a socket containing the processing unit that executed the corresponding thread. Alternatively, if threads are recorded into their own data streams, then recording the corresponding value of the corresponding memory access on behalf of the corresponding thread could comprise recording the corresponding value into a data packet that is part of a data steam that is exclusive to a processing unit that executed the corresponding thread.

Notably, where there are ambiguities (for example, after completing one or more of the techniques above), then some implementations may resolve or limit the options of the ambiguities. For example, if there are multiple options, an analysis could perform separate replays from the point of an ambiguity, and try a different option (and execution path) in each of the separate replays. In the uncommon case that these separate replays converge, then the choice made no difference and either option could be chosen. If one or more of the separate replays cause the execution to "derail", however, then those options/paths can be determined to be incorrect. Thus, method 1200 could include removing the one or more inter-thread data dependencies by resolving an ambiguity based on replaying two or more paths of execution using different starting conditions. This could include, for example, replaying a first path of execution using a first starting condition, and replaying a second path of execution using a second starting condition, where the first starting condition and the second starting condition are different options selected from multiple options of the ambiguity. These paths could then converge (in which case the ambiguity made no difference), or one could derail indicating that its starting condition was incorrect.

As part of this analysis, there are several considerations that can help speed up the analysis (e.g., to reduce the number of options/paths to explore, or even directly eliminate the ambiguity). For example, if the trace contains no speculative reads (this could be declared in the trace file(s) 104d by the processor(s) 102 and/or tracer 104a, for example), then the presence a packet indicates that a path had actually been taken that consumed that packet; knowing this can reduce the search space significantly. Additionally, with knowledge of the geometry of the cache, it is possible to guess which cache lines had the highest probability of having been evicted. This probability of eviction can then be used to prioritize searching paths that rely on data that is less likely to have been evicted first. Finally, if there is ordering information in the trace that provides cross-thread partial ordering (e.g., MINs) that information also can also be used to reduce the search space. For example, if the trace uses a global MIN, it stands to reason that cache misses on P0 done before MIN value 3 cannot depend on cache values from P1 logged after MIN 7.

Accordingly, the embodiments herein enhance replay performance of traces recorded by utilizing a processor's CCP to decouple trace data dependencies within CCP-based traces, such that these traces can be replayed in a thread-independent manner. This converts a trace that was recorded efficiently (e.g., in terms of recording overhead and trace file size) into a trace that is replayed efficiently (e.g., in terms of being able to parallelize replay of the thread, with the tradeoff of increasing trace file size).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
   one or more processors; and
   one or more computer-readable media having stored thereon computer-executable instructions that are executable by the one or more processors to cause the computer system to decouple trace data streams using cache coherence protocol (CCP) data, the computer-executable instructions including instructions that are executable to cause the computer system to perform at least the following:
   identify, within a trace of a prior execution of an application, one or more trace data streams that log execution of a plurality of threads during the prior execution of the application, the one or more trace data streams including cache activity trace data and CCP trace data, the cache activity trace data including one or more inter-thread data dependencies comprising at least one dependent cache activity trace entry that records a memory access by a first thread to a particular memory address in reliance on CCP trace data that identifies a data dependence between the first thread and a second thread, the data dependence indicating that the first and second threads both accessed the particular memory address; and remove the one or more inter-thread data dependencies, to create independent cache activity trace data for each of the plurality of threads that enables each thread to be replayed independent of others of the plurality of threads, including, for the at least one dependent cache activity trace entry, perform at least the following:

based on the CCP trace data that identifies the data dependence between the first and second threads, identify a value of the memory access by the first thread to the particular memory address, the identifying being based on identifying the value of the memory access from cache activity trace data trace data recorded for the second thread; and record the value of the memory access into a trace data stream corresponding to the first thread, the recording enabling the memory access to be replayed from the trace data stream corresponding to the first thread, independent of the cache activity trace data trace data recorded for the second thread.

2. The computer system of claim 1, wherein identifying the value of the memory access by the first thread comprises:
replaying the first thread to a point of the memory access; and
based on the CCP trace data that identifies the data dependence between the first and second threads, replaying the second thread to identify the value.

3. The computer system of claim 1, wherein identifying the value of the memory access by the first thread comprises:
while replaying the first thread, skipping replay of the memory access; and
based on the CCP trace data that identifies the data dependence between the first and threads, replaying the second thread to identify the value.

4. The computer system of claim 1, wherein identifying the value of the memory access by the first thread comprises:
based on the CCP trace data that identifies the data dependence between the first and second threads, identifying that the memory access by the first thread is dependent on a memory operation by the second thread; and
identifying the value based on cache activity trace data for the second thread.

5. The computer system of claim 1, wherein removing the one or more inter-thread data dependencies includes:
based on the CCP trace data that identifies the data dependence between the first and second threads, identifying a system of inequalities expressing the one or more inter-thread data dependencies; and
identifying an ordering of memory access events based on solving the system of inequalities.

6. The computer system of claim 1, wherein removing the one or more inter-thread data dependencies includes:
based on the CCP trace data that identifies the data dependence between the first and second threads, identifying a directed graph expressing the one or more inter-thread data dependencies; and
identifying an ordering of memory access events based on the one or more inter-thread dependencies in the directed graph.

7. The computer system of claim 1, wherein removing the one or more inter-thread data dependencies comprises iteratively replaying one or more portions of the plurality of threads, in which each iteration includes replacing at least one dependent cache activity trace entry with an independent cache activity trace entry that stores a memory value directly.

8. The computer system of claim 1, wherein recording the value of the memory access into the trace data stream corresponding to the first thread comprises recording the value into a data packet identifies at least one of:
a processing unit that executed the first thread; or
a socket containing the processing unit that executed the first thread.

9. The computer system of claim 1, wherein recording the value of the memory access into the trace data stream corresponding to the first thread comprises recording the value into a data packet that is part of a data steam that is exclusive to a processing unit that executed the first thread.

10. The computer system of claim 1, wherein the cache activity trace data is based at least on a subset of processor data cache misses caused by the plurality of threads during the prior execution of the application, and wherein the CCP trace data is based at least on a subset of cache coherence state changes that occurred due to the processor data cache misses caused by the plurality of threads during the prior execution of the application.

11. The computer system of claim 1, wherein removing the one or more inter-thread data dependencies comprises resolving an ambiguity based at least in part on:
replaying a first path of execution using a first starting condition; and
replaying a second path of execution using a second starting condition,
the first starting condition and the second starting condition being different options selected from multiple options of the ambiguity.

12. The computer system of claim 11, the first path of execution converging with the second path of execution.

13. A method, implemented at a computer system that includes one or more processors, for decoupling trace data streams using cache coherence protocol (CCP) data, the method comprising:
identifying, within a trace of a prior execution of an application, one or more trace data streams that log execution of a plurality of threads during the prior execution of the application, the one or more trace data streams including cache activity trace data and CCP trace data, the cache activity trace data including one or more inter-thread data dependencies comprising at least one dependent cache activity trace entry that records a memory access by a first thread to a particular memory address in reliance on CCP trace data that identifies a data dependence between the first thread and a second thread, the data dependence indicating that the first and second threads both accessed the particular memory address; and
removing the one or more inter-thread data dependencies, to create independent cache activity trace data for each of the plurality of threads that enables each thread to be replayed independent of others of the plurality of threads, including, for the at least one dependent cache activity trace entry, perform at least the following:
based on the CCP trace data that identifies the data dependence between the first and second threads, identify a value of the memory access by the first thread to the particular memory address, the identifying being based on identifying the value of the memory access from cache activity trace data trace data recorded for the second thread; and record the value of the memory access into a trace data stream corresponding to the first thread, the recording enabling the memory access to be replayed from the trace data stream corresponding to the first thread, independent of the cache activity trace data trace data recorded for the second thread.

14. The method of claim 13, wherein identifying the value of the memory access by the first thread comprises:

replaying the first thread to a point of the memory access; and based on the CCP trace data that identifies the data dependence between the first and second threads, replaying the second thread to identify the value.

15. The method of claim 13, wherein identifying the value of the memory access by the first thread comprises:

while replaying the first thread, skipping replay of the memory access; and based on the CCP trace data that identifies the data dependence between the first and second threads, replaying the second thread to identify the value.

16. The method of claim 13, wherein, for at least one dependent cache activity trace entry, identifying the corresponding value of the corresponding memory access by the corresponding thread comprises:

based on the CCP trace data that identifies the data dependence between the first and second threads, identifying that the memory access by the first thread is dependent on a memory operation by the second thread; and identifying the value based on cache activity trace data for the second thread.

17. The method of claim 13, wherein removing the one or more inter-thread data dependencies includes:

based on the CCP trace data that identifies the data dependence between the first and second threads, identifying a system of inequalities expressing the one or more inter-thread data dependencies; and identifying an ordering of memory access events based on solving the system of inequalities.

18. The method of claim 13, wherein removing the one or more inter-thread data dependencies includes:

based on the CCP trace data that identifies the data dependence between the first and second threads, identifying a directed graph expressing the one or more inter-thread data dependencies; and identifying an ordering of memory access events based on the one or more inter-thread dependencies in the directed graph.

19. The method of claim 13, wherein removing the one or more inter-thread data dependencies comprises iteratively replaying one or more portions of the plurality of threads, in which each iteration includes replacing at least one dependent cache activity trace entry with an independent cache activity trace entry that stores a memory value directly.

20. A computer program product comprising one or more hardware storage devices having stored thereon computer-executable instructions that are executable by one or more processors to cause a computer system to decouple trace data streams using cache coherence protocol (CCP) data, the computer-executable instructions including instructions that are executable to cause the computer system to perform at least the following:

identify, within a trace of a prior execution of an application, one or more trace data streams that log execution of a plurality of threads during the prior execution of the application, the one or more trace data streams including cache activity trace data and CCP trace data, the cache activity trace data including one or more inter-thread data dependencies comprising at least one dependent cache activity trace entry that records a memory access by a first thread to a particular memory address in reliance on CCP trace data that identifies a data dependence between the first thread and a second thread, the data dependence indicating that the first and second threads both accessed the particular memory address; and remove the one or more inter-thread data dependencies, to create independent cache activity trace data for each of the plurality of threads that enables each thread to be replayed independent of others of the plurality of threads, including, for the at least one dependent cache activity trace entry, perform at least the following:

based on the CCP trace data that identifies the data dependence between the first and second threads, identify a value of the memory access by the first thread to the particular memory address, the identifying being based on identifying the value of the memory access from cache activity trace data trace data recorded for the second thread; and record the value of the memory access into a trace data stream corresponding to the first thread, the recording enabling the memory access to be replayed from the trace data stream corresponding to the first thread, independent of the cache activity trace data trace data recorded for the second thread.

* * * * *